(12) United States Patent
Jiang

(10) Patent No.: US 8,074,367 B2
(45) Date of Patent: *Dec. 13, 2011

(54) MOTION SENSOR FOR MEASUREMENT IN A DYNAMIC ENVIRONMENT OF CO-EXISTING TILT AND HORIZONTAL ACCELERATION

(76) Inventor: Sam Shu-Sheng Jiang, Mesa, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/965,847

(22) Filed: Dec. 11, 2010

(65) Prior Publication Data

US 2011/0120220 A1    May 26, 2011

Related U.S. Application Data

(63) Continuation-in-part of application No. 12/625,333, filed on Nov. 24, 2009.

(51) Int. Cl.
*G01C 9/12*    (2006.01)
*G01P 15/12*   (2006.01)

(52) U.S. Cl. ........................ 33/391; 33/366.12
(58) Field of Classification Search ............. 33/391, 33/366.12, 366.24
See application file for complete search history.

(56) References Cited

U.S. PATENT DOCUMENTS

| | | | | |
|---|---|---|---|---|
| 5,148,604 | A * | 9/1992 | Bantien | 33/366.12 |
| 5,279,040 | A | 1/1994 | Kippelt et al. | |
| 5,708,206 | A * | 1/1998 | Anderson et al. | 73/514.21 |
| 5,739,431 | A * | 4/1998 | Petri | 33/365 |
| 5,886,260 | A * | 3/1999 | Anderson et al. | 73/514.21 |
| 6,282,804 | B1 * | 9/2001 | Jiang | 33/366.21 |
| 6,470,580 | B1 * | 10/2002 | Ushihara et al. | 33/366.24 |
| 7,325,322 | B2 * | 2/2008 | Fulks et al. | 33/366.24 |
| 7,360,419 | B2 | 4/2008 | French et al. | |
| 7,444,867 | B2 * | 11/2008 | Brett et al. | 73/382 R |
| 2002/0092352 | A1 | 7/2002 | Foote | |
| 2005/0016005 | A1 * | 1/2005 | Voecks | 33/344 |
| 2005/0198846 | A1 * | 9/2005 | Nagata | 33/366.11 |
| 2007/0214886 | A1 * | 9/2007 | Sheynblat | 73/509 |
| 2010/0070193 | A1 * | 3/2010 | Solinsky | 702/19 |
| 2011/0119942 | A1 * | 5/2011 | Jiang | 33/391 |
| 2011/0120220 | A1 * | 5/2011 | Jiang | 73/514.12 |
| 2011/0208444 | A1 * | 8/2011 | Solinsky | 702/41 |

OTHER PUBLICATIONS

Zing, Yizi, An Electronic Spirit Level Tilt Sensor, Ph.D. Thesis, Technical University of Delft, Netherlands, Feb. 28, 1989, whole document, especially pp. 7-9.
Forward, Robert L., Gravity Sensors and the Principle of Equivalence, IEEE Transactions on Aerospace and Electronic Systems, Jul. 1981, vol. AES-17, No. 4, pp. 511-519. IEEE.

* cited by examiner

*Primary Examiner* — Yaritza Guadalupe-McCall
(74) *Attorney, Agent, or Firm* — Keith L. Jenkins, Registered Patent Attorney, LLC; Keith L. Jenkins

(57) ABSTRACT

A motion-sensing device for sensing tilt and acceleration when either tilt, horizontal acceleration, or tilt and horizontal acceleration acting concurrently, influence the device, including: a substrate having a vertical surface, a first accelerometer fixed to the vertical surface of the substrate; a pendulum flexibly coupled to the substrate proximate to the first accelerometer; and a second accelerometer fixed to the pendulum. The first and/or second accelerometers are preferably an accelerometer; a spring-mass system; and/or any tilt or accelerometer sensitive elements. The first accelerometer includes an accelerometer that measures tilt and linear acceleration in a first geometric plane, the pendulum is constrained to move in the first geometric plane, and the second accelerometer is operable to measure linear acceleration in the first geometric plane. The motion-sensing device or devices coupled to a machine, vehicle, and/or a control system. The pendulum is critically damped using a damping fluid.

20 Claims, 34 Drawing Sheets

MOTION SENSOR FOR MEASUREMENT IN A DYNAMIC ENVIRONMENT OF CO-EXISTING TILT AND HORIZONTAL ACCELERATION

RELATED APPLICATIONS

This application is a continuation-in-part of application Ser. No. 12/625,333 to the same inventor.

FIELD OF THE INVENTION

This invention relates to a motion sensor for measurement in a dynamic environment of co-existing tilt and acceleration.

BACKGROUND OF THE INVENTION

There are many different designs of tilt sensors or angular sensors or inclinometers and accelerometers and some of them are already commercialized. It is a well known problem for available sensors that they can measure either tilt (inclination angle) or horizontal acceleration, but not both concurrently, because acceleration can generate a tilt signal in a tilt sensor:

$$\beta = \arctan(a/g)$$

where $\beta$ is the tilt signal angle, a is the horizontal linear acceleration and g is the gravitational acceleration. In the figures that follow, gravitational acceleration g is directed toward the bottom of the page. Likewise, tilt can generate a horizontal acceleration signal in an accelerometer.

In the case where both tilt and acceleration occur concurrently, however, legacy sensors cannot distinguish between tilt and acceleration and, therefore, cannot measure the signal generated by tilt and the signal generated by acceleration separately in dynamic environment. For example, a tilt sensor or an accelerometer or both are mounted in a moving vehicle, which is a dynamic environment. It is very difficult to measure either tilt or acceleration or both of them separately because of interference from tilt with acceleration and interference of acceleration with tilt. Robert L. Forward designed a method to directly measure these two signals in separate forms. However, he further stated that this method was only academically correct. Robert L. Forward proposed another method to separate these two terms by measuring the resonant frequencies of the sensors and determine the tensor components. French, et al., also used resonant frequency to decrease the noise brought by the horizontal acceleration to measure gravitational field. Dosch, et al., calculated the gravitational field with better accuracy by accounting for undesired accelerations picked up by accelerometers having input axes that are not parallel to the gradiometer disc.

The remaining problem of how to accurately measure the tilt and horizontal acceleration in separate terms and at the same time, however, is yet to be completely resolved. Progress has been made by the present inventor, as shown by U.S. Pat. No. 6,282,804 to the present invention and co-pending U.S. patent application Ser. No. 12/625,333 to the present inventor.

OBJECTS AND FEATURES OF THE INVENTION

A primary object and feature of the present invention is to overcome the above-mentioned problems and fulfill the above-mentioned needs. Another object and feature of the present invention is to provide a motion sensor that can sense tilt and acceleration whether occurring separately or concurrently. It is a further object and feature of the present invention to provide a sensor structure that can incorporate various accelerometers and the like. It is a further object and feature of the present invention to provide calculation methods for determination of various parameters based on the measurement results, such as acceleration, tilt, linear speed, moving distance etc with co-existing tilt and linear acceleration in a dynamic environment. It is a further object of the present invention to provide a tilt and acceleration sensor that may be implemented in various sizes, from micro-electro-mechanical system (MEMS) to box-level motion sensing devices. It is a further object of the present invention to provide basis for a method to implement and embed the said motion-sensing device to a compact MEMS single packaged chip. It is a further object and feature of the present invention to provide a practical sensor structure which may be tailored into a practical micro-electro-mechanical system (MEMS) as a single component. It is a further object and feature of the present invention to provide practical methods for calculation of the test data for practical applications of the present invention. It is a further object and feature of the present invention as how to define a best damping fluid to damp the pendulum system in this invented motion motion-sensing device.

It is an additional primary object and feature of the present invention to provide such a system that is efficient, inexpensive and handy. Other objects and features of this invention will become apparent with reference to the following descriptions.

SUMMARY OF THE INVENTION

This invention uses a motion sensing device having at least two accelerometers with at least one accelerometer mounted to a substrate and with at least one other sensor mounted firmly on the end part of a pendulum. The pendulum is hung on the substrate vertically and can rotate freely in a single geometric plane, preferably in critically damping fluid in a gravitational field. As a result of being in free rotation, the arm of the pendulum is always parallel with the gravitational direction when the substrate is tilted either if there is an additional linear acceleration or no additional linear acceleration. The first accelerometer senses the mixed signals generated by both tilt and linear horizontal acceleration without distinguishing the two components. The second accelerometer is able to only measure the linear horizontal acceleration without the interference from tilt. The tilt can be calculated from the signals output from the first accelerometer and the second accelerometer. As a result, the motion, in the dynamic environment of co-existing influences of both horizontal acceleration along the level direction and tilt along the gravitational direction, can be separated into two components, tilt and linear acceleration, respectively. As a result, both tilt and acceleration can be measured separately in the co-existing dynamic environment.

The present invention provides a motion-sensing device for sensing tilt and linear horizontal acceleration when either tilt, horizontal acceleration, or tilt and horizontal acceleration acting concurrently, influence the device, the device including: a substrate having a top and a bottom. The top side of the substrate is parallel with the gravitational direction. A first accelerometer mounted to the top of the substrate with the sensing axis vertical to the gravitational direction; a pendulum flexibly coupled to the top of the substrate through a pendulum rod and flexible wire or a pendulum rod with a ring at the end and can rotate around a rod which is firmly mounted vertically on the substrate and can swing in the geometric plane parallel to the top side of the substrate; and a second accelerometer fixed to the pendulum with the sensing axis along the horizontal direction and vertical to the gravitational direction also.

BRIEF DESCRIPTION OF THE DRAWINGS

The foregoing and other features of the invention may become more apparent when the following description is read together with drawings, in which.

DESCRIPTION OF THE INVENTION

In the following description, references used in the figures are indicated in bold. Gravity, indicated as "g" in the equations, acts toward the bottom of the page in the illustrations.

Figure 1:
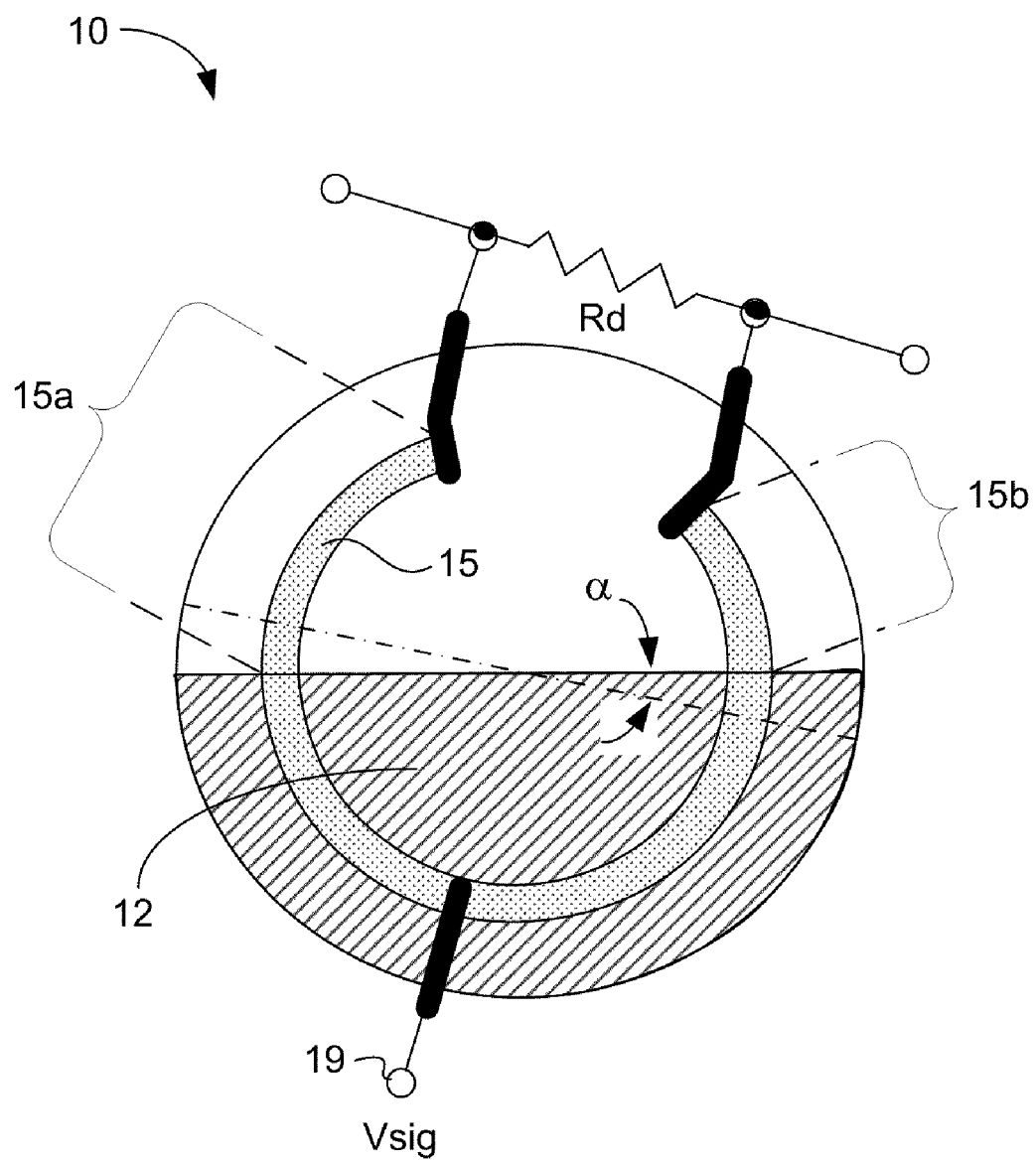
FIG. 1 is a view of a tilt sensor as shown in U.S. Pat. No. 6,282,804 to the present inventor.

FIG. 1 is a view of a tilt sensor 10 as shown in U.S. Pat. No. 6,282,804 to the present inventor. Tilt sensor 10 cannot measure tilt α separated from the linear horizontal acceleration a or measure linear horizontal acceleration a separated from the tilt α, respectively, in the dynamic environment of co-existing tilt α and the linear horizontal acceleration a. The tilt sensor 10 has an electrolytic fluid 12 and resistive element 15 including dry curve lengths 15a and 15b, which are more resistive than the portion of resistive element 15 that is wetted by electrolytic fluid 12. Resistive element 15 is preferably a section of a circle. Arcuate resistive element 15 is imprinted on a ceramic substrate, and so is substantially within a single geometric plane. This sensor 10 can accurately and linearly measure tilt angle α. The tilt angle α output from the sensor 10 is proportional to the difference of the dry curve lengths 15a and 15b of the resistive element 15. When tilt sensor 10 is not tilted, the lengths of 15a and 15b are equal, making the resistances of 15a and 15b equal, and creating a zero-tilt indication at output terminal 14.

Figure 2:
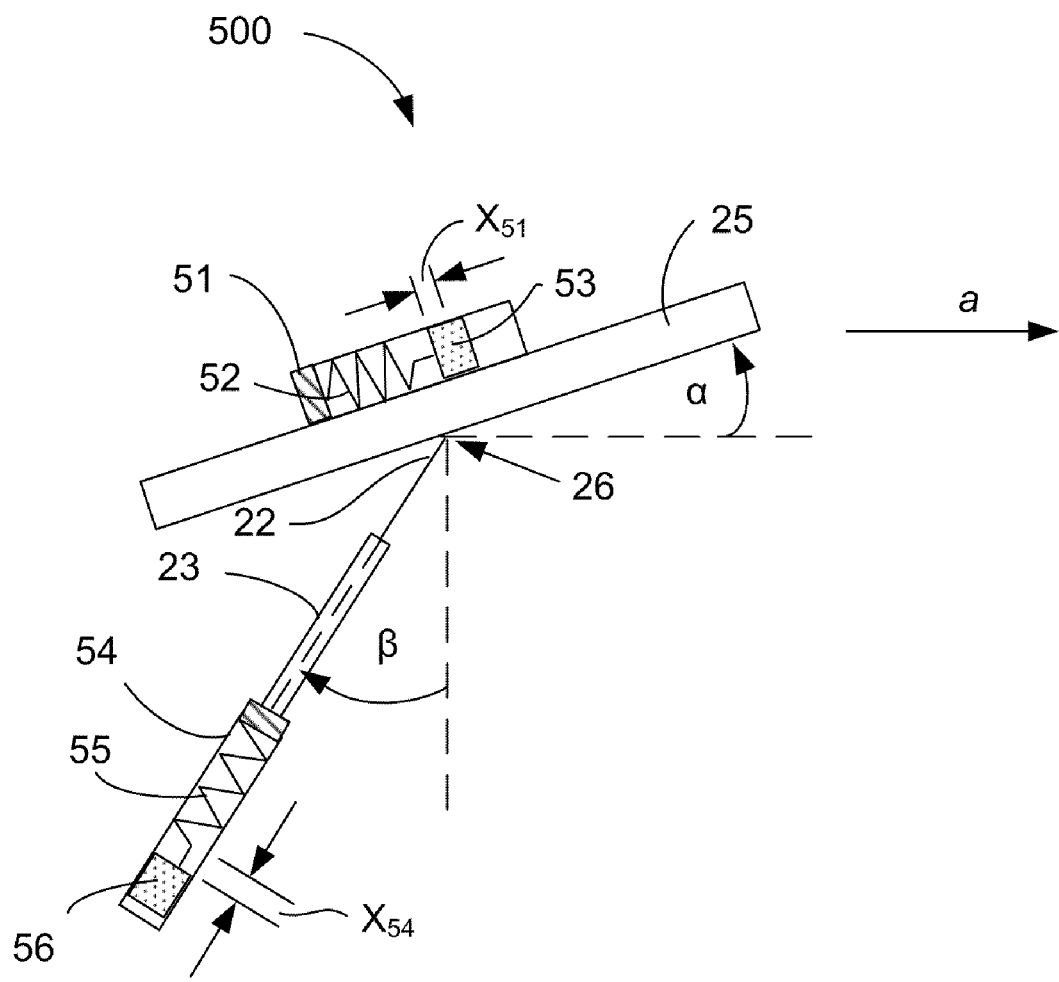
FIG. 2 is a view of a prior art motion sensor as shown in U.S. patent application Ser. No. 12/625,333 to the present inventor, illustrating a combined tilt and motion sensor having two spring-mass systems concurrently under the influence of tilt and acceleration.

FIG. 2 is a prior art motion motion-sensing device 500 as shown in U.S. patent application Ser. No. 12/625,333 by the present inventor, which patent is incorporated herein in its entirety by reference. This motion-sensing device 500 has two spring-mass systems 54 and 51 where the first spring-mass system 51 can measure the tilt α and linear horizontal acceleration a together in one value and the second spring-mass system 54 is not sensitive to tilt α and measures only the linear horizontal acceleration a. As a result, theoretically, the motion motion-sensing device 500 can measure the tilt α and the linear horizontal acceleration a separately. The present disclosure shows, inter alia, experimental data that confirm the conclusions in U.S. patent application Ser. No. 12/625,333.

Figure 3B:
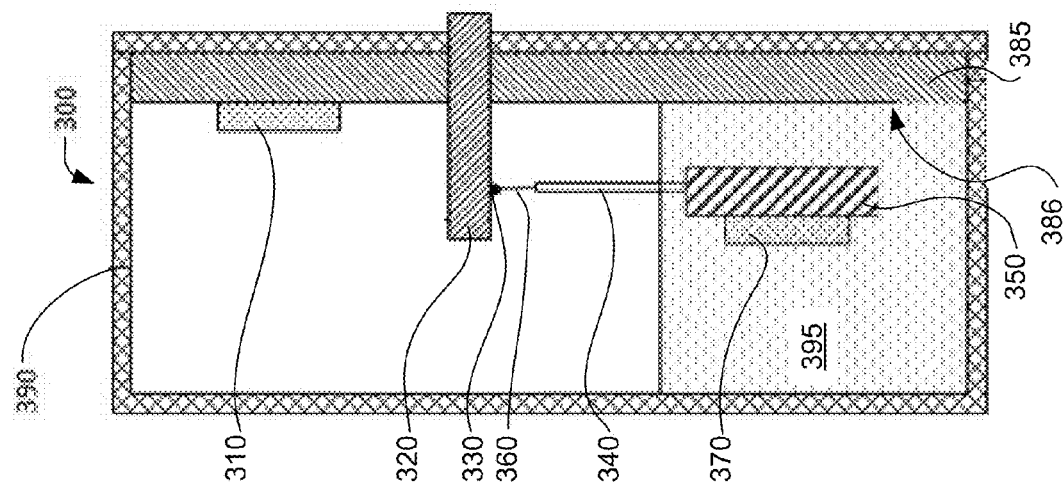
FIG. 3B is a side diagrammatic view illustrating the exemplary the exemplary motion-sensing device with populated PCB having two accelerometers and one pendulum system, according to a preferred embodiment of the present invention.
Figure 3A:
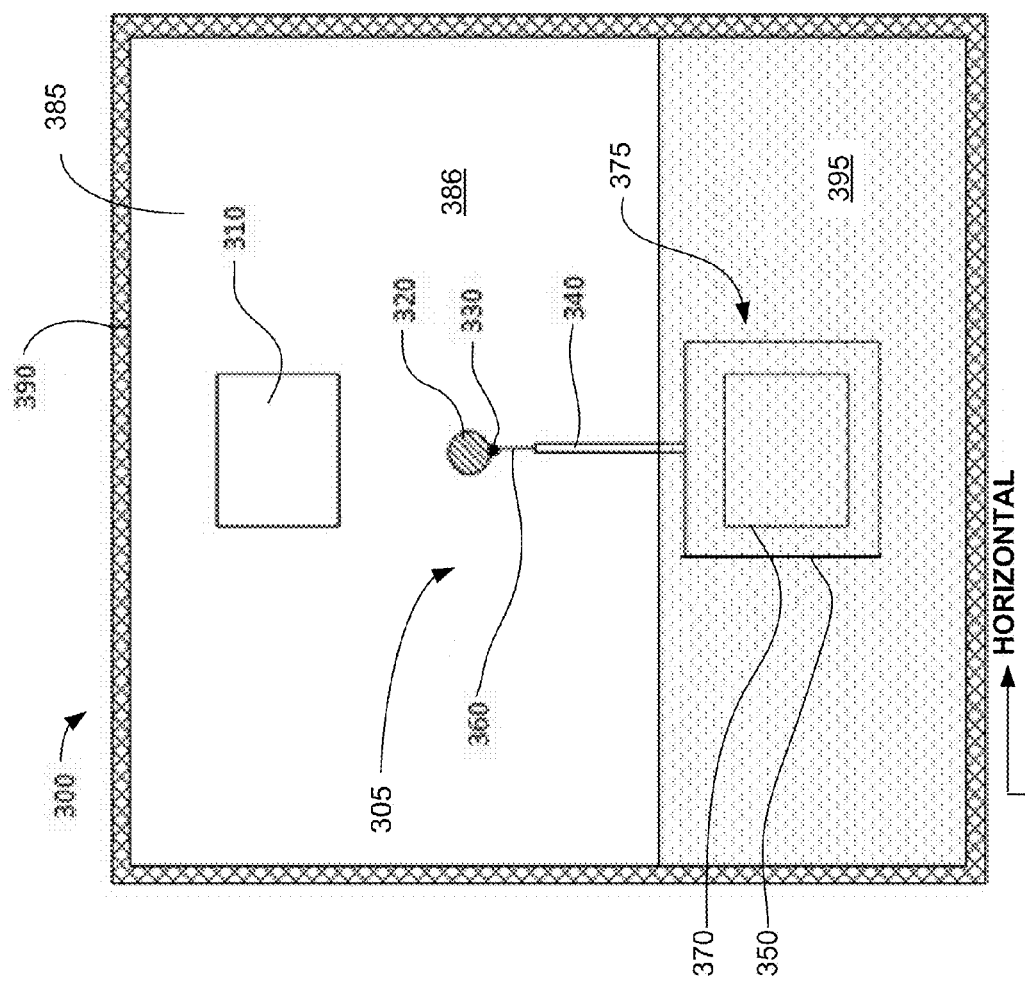
FIG. 3A is a front diagrammatic view illustrating an exemplary embodiment of a motion-sensing device including parts populated on an exemplary printed circuit board (PCB), according to a preferred embodiment of the present invention.

FIG. 3A is a front diagrammatic view illustrating an exemplary embodiment of a motion-sensing device 300 including parts populated on an exemplary printed circuit board (PCB) substrate 385 (See FIG. 3B), according to a preferred embodiment of the present invention. A motion-sensing device 305, 310 is coupled to the substrate 385 in an enclosure 390, preferably made of a lightweight rigid material, such as plastic. A first accelerometer 310 is mounted on the front face 386 of the printed circuit board (PCB) substrate 385. A pendulum system 305 includes a pendulum rod 340 that is attached via a flexible coupling wire 360 to a central point 330 fixed at a supporting rod 320. A second accelerometer 370 is mounted on another PCB substrate 350 to form the pendulum 375 of the pendulum system 305, and is connected to the rod 340. The pendulum system 305 can swing freely from central point 330 on support rod 320 in the geometric plane parallel to the front face 386 of PCB substrate 385. Here it is preferred that the pendulum 375 is much heavier than the combined weight of the flexible wire 360 and the pendulum rod 340. The pendulum 375 and a portion of pendulum rod 340 is immersed in a damping fluid 395, preferably near the critically-damped state where the pendulum 375 can sense a dynamic environment quickly without a significant self-oscillation. An under-damped state can cause the pendulum system 305 to oscillate when subjected to a dynamic force and brings significant noise into the measurement. An over-damped state can make the pendulum system 375 sense too slowly to a dynamic force and, therefore, brings significant error in a quickly changed dynamic environment. In the following descriptions of this invention, the enclosure 390 and the damping fluid 395 are included in the motion-sensing device 300 and will not be shown hereafter. The accelerometers 310, 370 used in the experiment have Analog-Device part number ADXL330KCPZ-RL but can be any of various similar accelerometers and each has at least one-sensing axis. In this motion-sensing device 300, the accelerometers 310, 370 are mounted and orientated as the sensing-axis Y on the linear horizontal direction and X-axis on the gravitational, or vertical, direction.

FIG. 3B is a side diagrammatic view illustrating the exemplary motion-sensing device 300 with populated PCB substrate 385 having two accelerometers 310, 370 and one pendulum system 305, according to a preferred embodiment of the present invention. Flexible wire 360 is preferably flexible in a plane parallel to the front face 386 of substrate 385, and not flexible in other planes, to constrain the motion of pendulum system 305 to motion parallel to the front face 386 of substrate 385.

Figure 3C:
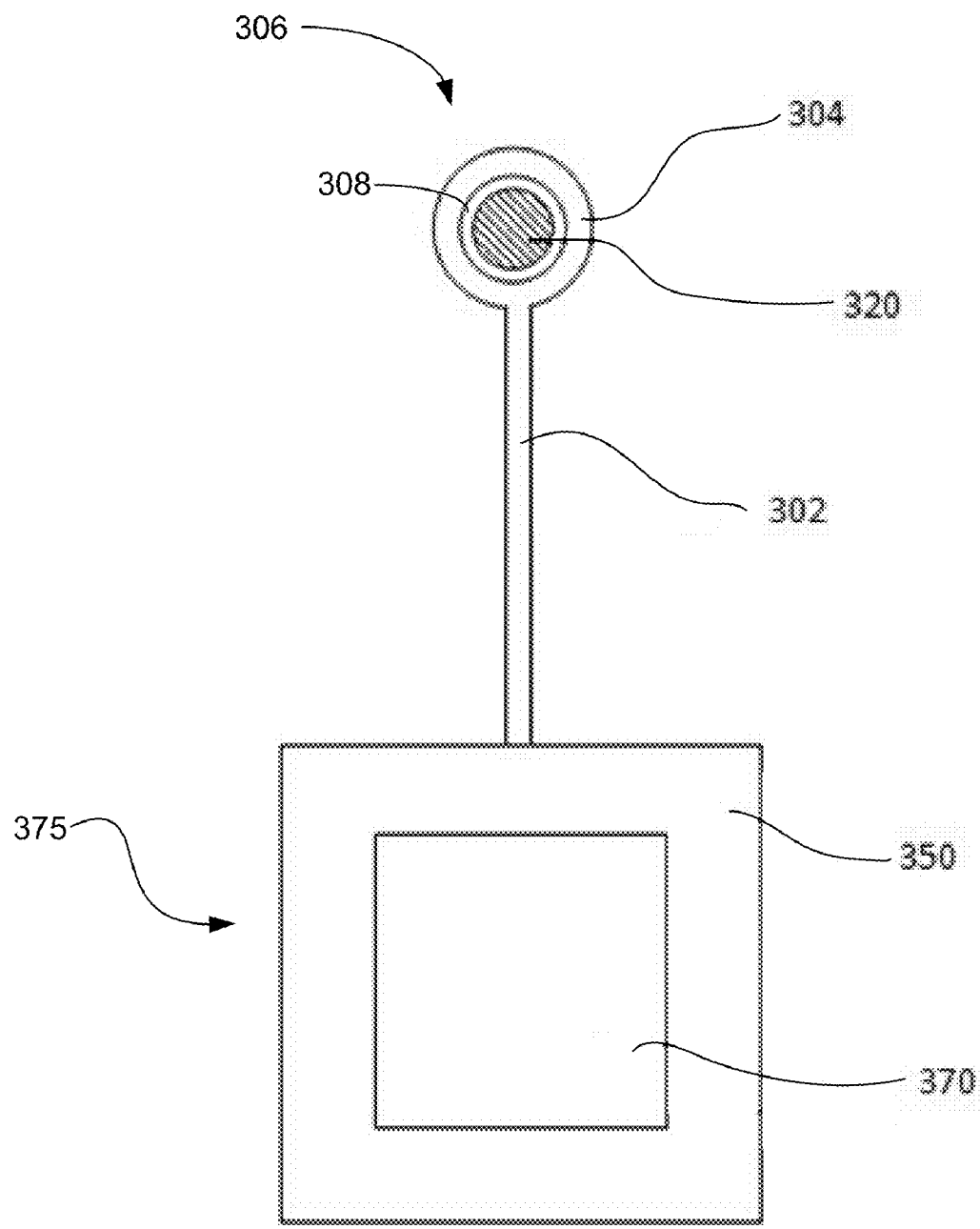
FIG. 3C is a front diagrammatic view illustrating an alternate embodiment of the pendulum system of FIG. 3A, according to a preferred embodiment of the present invention.
Figure 4:
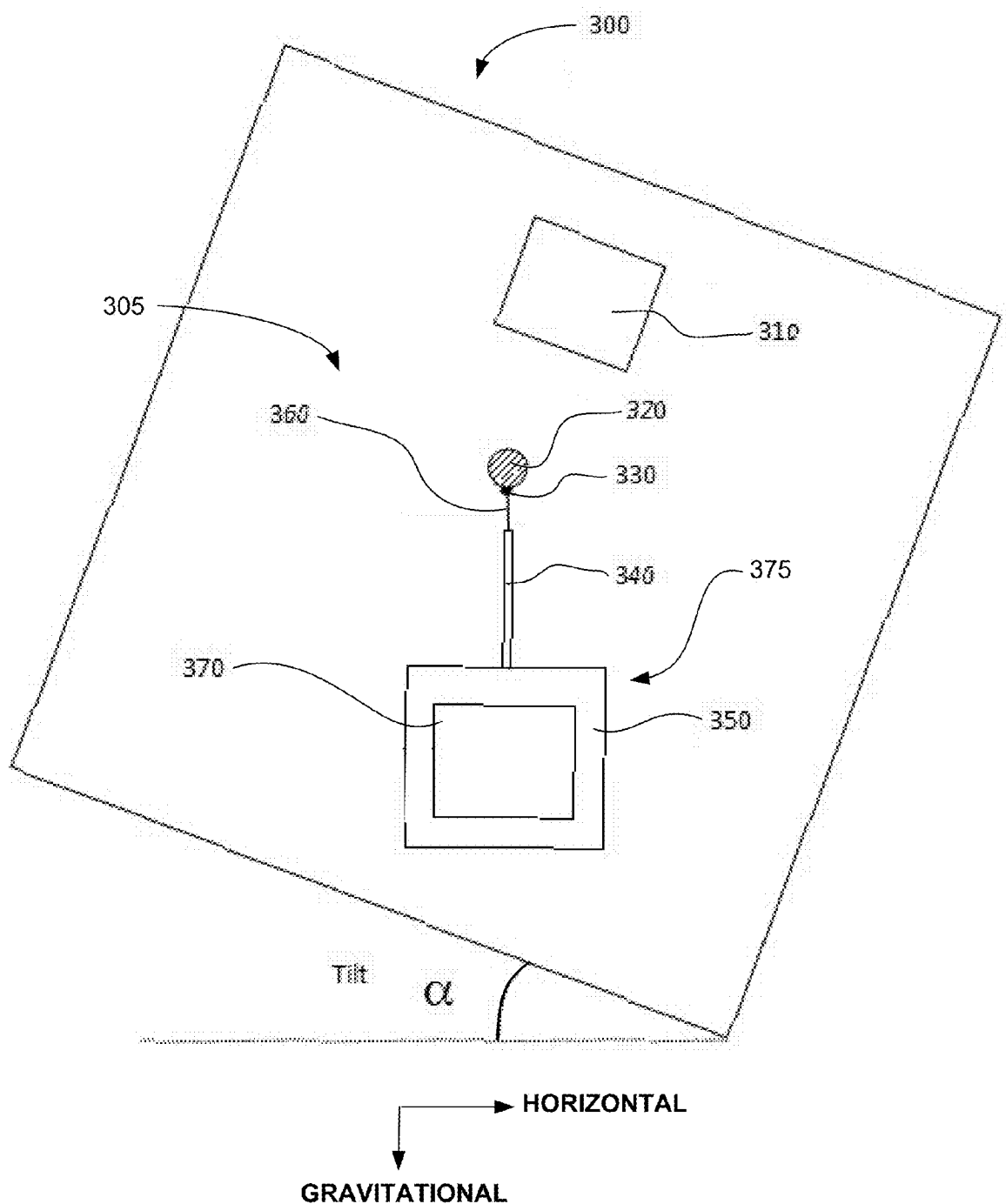
FIG. 4 is a front diagrammatic view illustrating the motion-sensing device under the influence of tilt but not linear horizontal acceleration, according to a preferred embodiment of the present invention.

FIG. 3C is a front diagrammatic view illustrating an alternate embodiment 306 of the pendulum system 305 of FIG. 3A, according to a preferred embodiment of the present invention. In the pendulum system 306, the flexible wire 360 is replaced with a pendulum arm 302 of which one end is attached to the PCB substrate 350 and the other end forms a ring 304 hung around the pendulum support rod 320, which also has a round cross section, but the outer diameter of which is smaller than the interior diameter of the ring 304. With the pendulum 375 much heavier than the weight of pendulum arm 302, the pendulum system 306 can rotate freely around the supporting rod 320 through the coupling of the ring 304 around the round supporting rod 320. Optional bushing 308 provides for low friction rotation of ring 304 about supporting rod 320. For simplicity and clearer understanding, other parts of the motion-sensing device 300 are not shown in FIG. 3C FIG. 4 is a front diagrammatic view illustrating the motion-sensing device 300 under the influence of tilt α but not linear horizontal acceleration a, according to a preferred embodiment of the present invention. The accelerometer 310 will sense the tilt α but the sensing axis of the accelerometer 370 is still vertical to the gravitational direction and, therefore, will not sense the tilt α. If damping is critical, the output of accelerometer 370 will be zero and the output of accelerometer 310 will be proportional to the tilt α.

Figure 5:
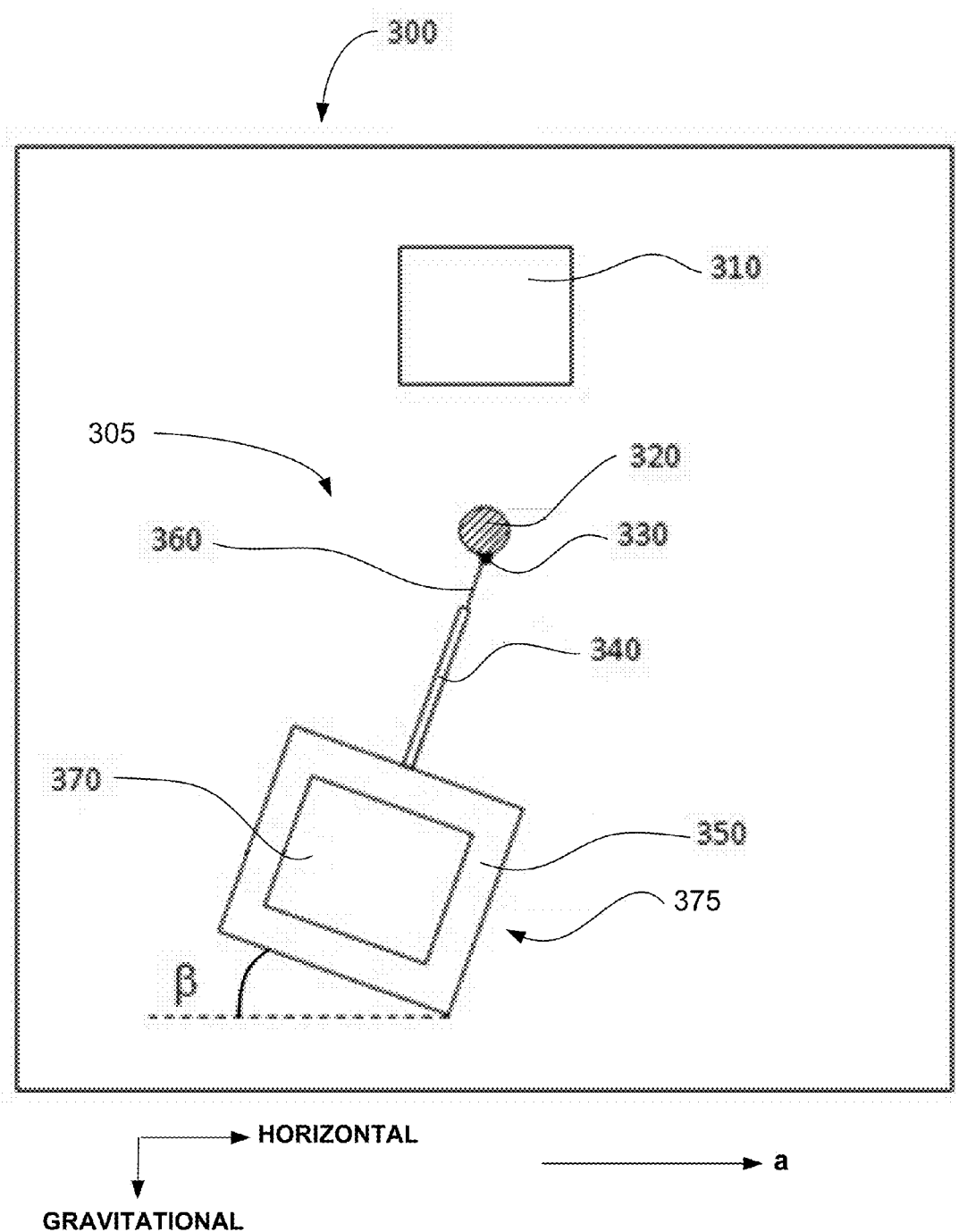
FIG. 5 is a front diagrammatic view illustrating the exemplary motion-sensing device under the influence of linear horizontal acceleration but not tilt, according to a preferred embodiment of the present invention.

FIG. 5 is a front diagrammatic view illustrating the exemplary motion-sensing device 300 under the influence of linear horizontal acceleration a, but not tilt α, according to a preferred embodiment of the present invention. The linear acceleration a makes the pendulum system 305 tilt an angle β and, therefore, both the accelerometer 310 and the accelerometer 370 can sense the same linear acceleration and produce equal outputs.

Figure 6:
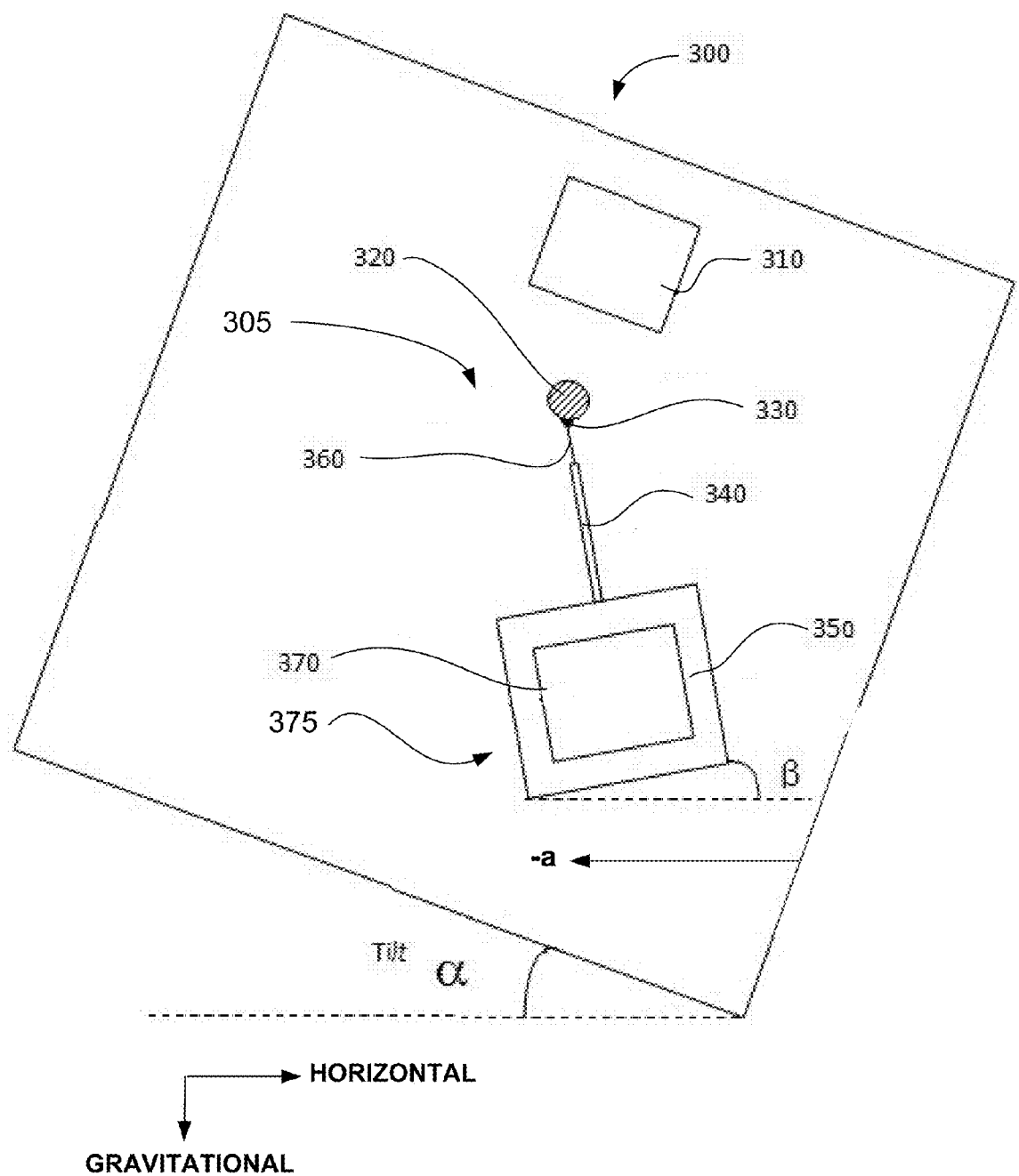
FIG. 6 is a front diagrammatic view illustrating the motion-sensing device under the influence of co-existing linear horizontal acceleration and tilt, according to a preferred embodiment of the present invention.

FIG. 6 is a front diagrammatic view illustrating the motion-sensing device 300 under the influence of co-existing linear horizontal acceleration −a and tilt α, according to a preferred embodiment of the present. The acceleration makes the pendulum 305 tilt an angle β and, therefore, the accelerometer 310 will sense, as a single value, the sum of both linear horizontal acceleration −a and tilt α and the accelerometer 370 will sense only the linear horizontal acceleration −a.

Figure 7:
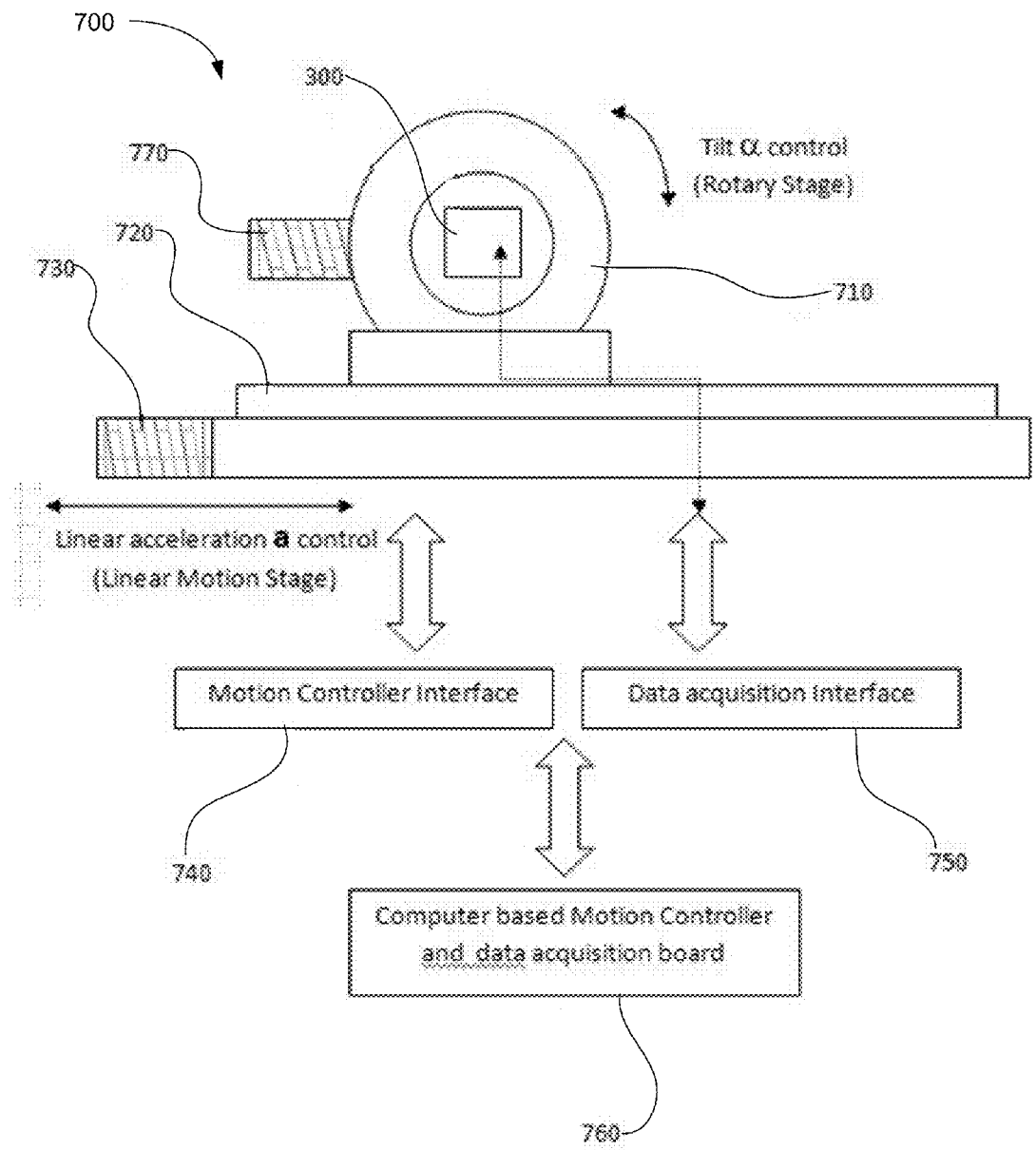
FIG. 7 is a front diagrammatic view illustrating an exemplary embodiment of a motion stage having one linear horizontal motion stage and a rotary stage, a motion control interface and a computer based motion control and data acquisition system, according to a preferred embodiment of the present invention.

FIG. 7 is a front diagrammatic view illustrating an exemplary embodiment of a motion stage 700 having one linear horizontal motion stage 720 and a rotary stage 710, a motion control interface 740, and a computer based motion control and data acquisition system 760, according to a preferred embodiment of the present invention. Motion stage 700 further includes a driving screw system 730 for the linear horizontal motion stage 720, a driving screw system 770 for the rotary stage 710, the motion-sensing device 300 mounted on a platform of the rotary stage 710 with the sensor Y-axis and X-axis parallel to the rotary plane of the rotary stage 710, a motion control interface 740, including optical decoders for monitoring screw driving 730, 770 states, connected to the driving screws 730 and 770, a data acquisition interface 750 communicatively coupled to the motion-sensing device 300, and a computer based motion controller and data acquisition board 760. For clearer understanding of the control and testing devices, the electronic wires, including the wires in the motion-sensing device 300, sensor conditioning electronic parts and mechanical parts of motion control units are not shown in the drawing. The linear motion stage 720 provides the horizontal acceleration a driving force and the rotary stage 710 provides the driving force for the tilt α.

Figure 8A:
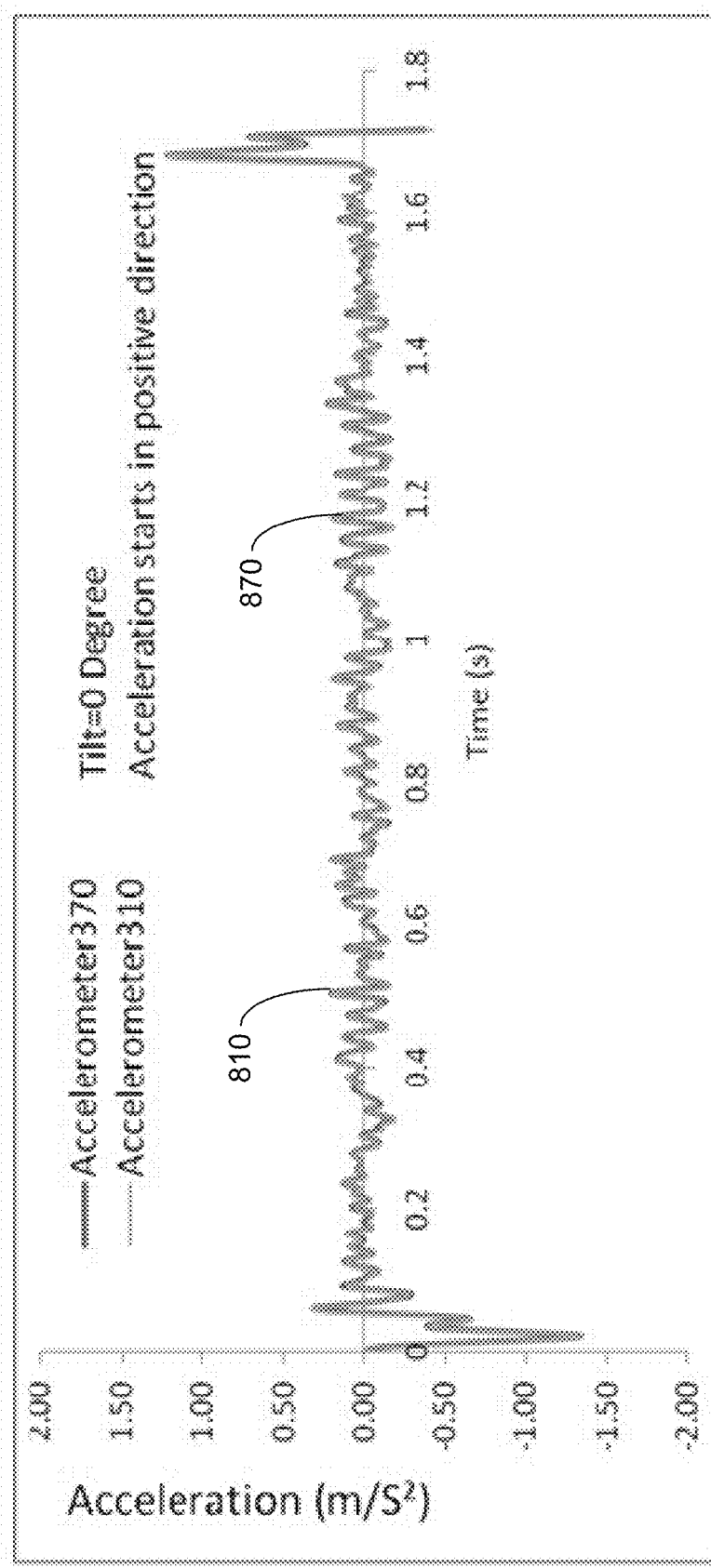
FIG. 8A illustrates first test results from both accelerometers for measurement of co-existing tilt and linear horizontal acceleration using the exemplary sensor of FIG. 3 in the motion stage of FIG. 7 in a dynamic environment, for the case of no tilt with positive and negative accelerations, according to a preferred embodiment of the present invention.

FIG. 8(A) illustrates first test results from both accelerometers 310, 370 for measurement of co-existing tilt α and linear horizontal acceleration a using the exemplary sensor 300 of FIG. 3 in the motion stage 700 of FIG. 7 in a dynamic environment, for the case of no tilt α with positive and negative accelerations a, according to a preferred embodiment of the present invention. FIG. 8A shows acceleration readings 810 and 870 measured by the accelerometers 310 and 370, respectively, with the motion stages 710, 720 controlled to produce the motion profile 850 as shown in FIG. 8D. The linear horizontal acceleration a is calculated by:

$$a = g \tan[\arc \sin(a_{370}/g)] \quad (1)$$

Here g is the gravitation acceleration g=9.81 m/s², $a_{370}$ is the acceleration reading by the accelerometer 370. Equation (1) can be simplified to $$a \approx a_{370} \text{ when } a_{370} << \tfrac{1}{2} \pi g \quad (2)$$

The outputs 810 and 870 of accelerometers 310 and 370 overlap on the graph of FIG. 8A because they are almost identical and agree with the conclusion as predicted in the discussion regarding FIG. 6. The tilt α can be calculated by $$\alpha = \arcsin(a/k) - \arcsin(a_{310}/k) \quad (3)$$

Where $a_{310}$ is the acceleration reading of accelerometer 310 and $$k = \sqrt{a^2 + g^2} \quad (4)$$

Figure 8B:
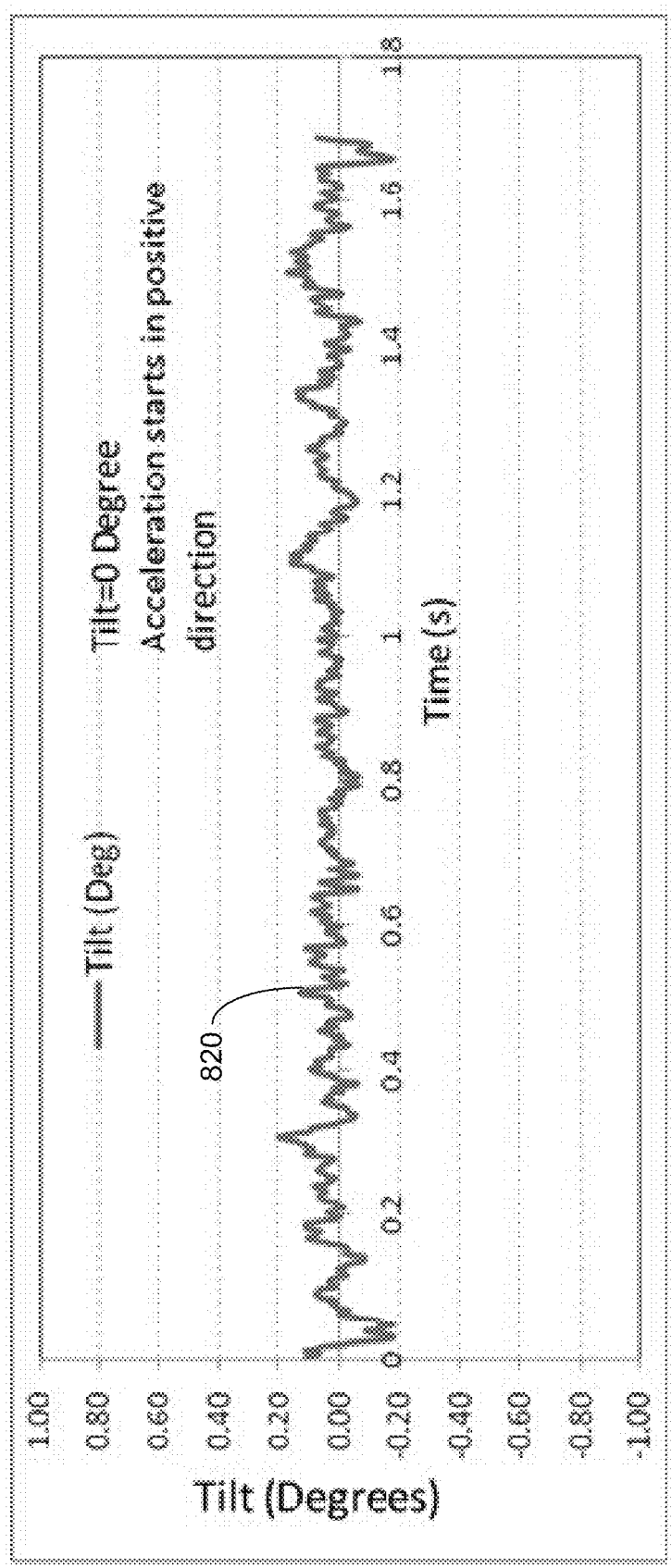
FIG. 8B illustrates first test results for the motion-sensing device for measurement of co-existing tilt and linear horizontal acceleration using the exemplary motion-sensing device of FIG. 3 in the motion stage of FIG. 7 in a dynamic environment, for the case of no tilt with positive and negative accelerations, according to a preferred embodiment of the present invention.

FIG. 8B illustrates first test results for the motion-sensing device 300 for measurement of co-existing tilt α and linear horizontal acceleration a using the exemplary motion-sensing device 300 of FIG. 3 in the motion stage of FIG. 7 in a dynamic environment, for the case of no tilt α with positive and negative accelerations a, according to a preferred embodiment of the present invention. FIG. 8B graphs the tilt angle α calculated and measured with the motion-sensing device 300 in a dynamic environment including tilt α and linear horizontal acceleration a. With linear horizontal acceleration a and tilt α measured separately and correctly, the speed and distance moved by the linear stage 720 can be calculated by integration of the linear acceleration a against the time:

$$v = \int_0^{t_1} a \, dt \quad (5)$$

$$S = \iint_0^{t_1} a \, dt \, dt \quad (6)$$

Where t is the time, $t_1$ is the time for the period of the motion, v is the speed 840 (See FIG. 8D) and S is the distance 830 (See FIG. 8C) moved.

Figure 8C:
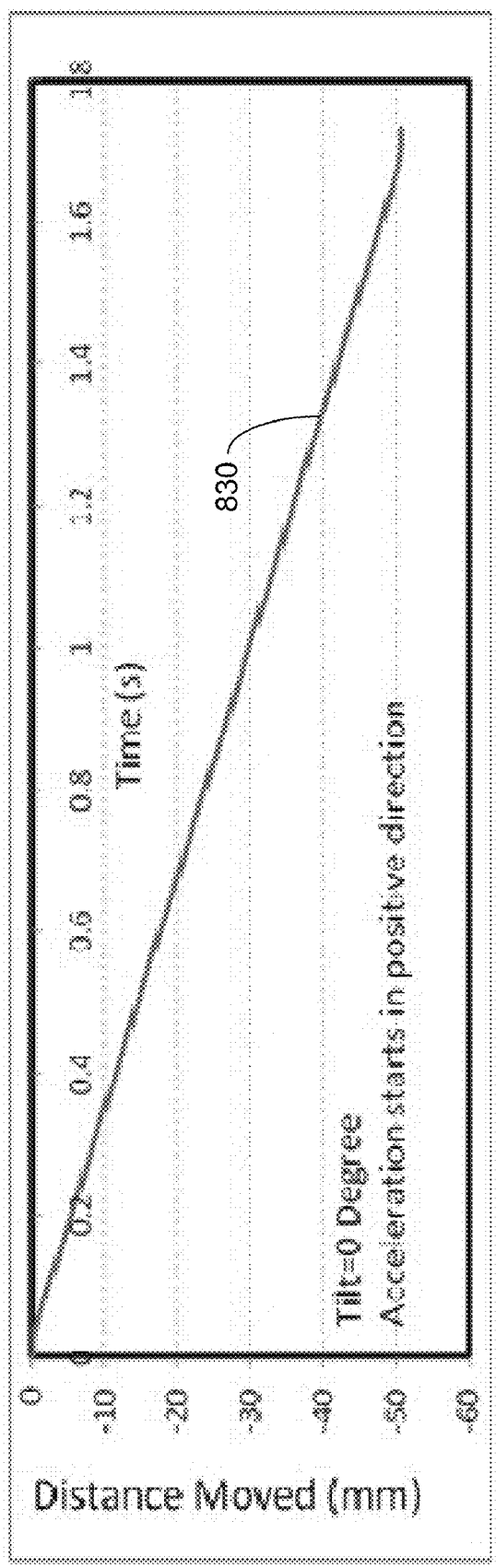
FIG. 8C illustrates calculated distance as a function of time for the first test results for both accelerometers for measurement of co-existing tilt and linear horizontal acceleration using the exemplary motion-sensing device of FIG. 3 in the motion stage of FIG. 7 in a dynamic environment, for the case of no tilt with positive and negative accelerations, according to a preferred embodiment of the present invention.
Figure 8D:
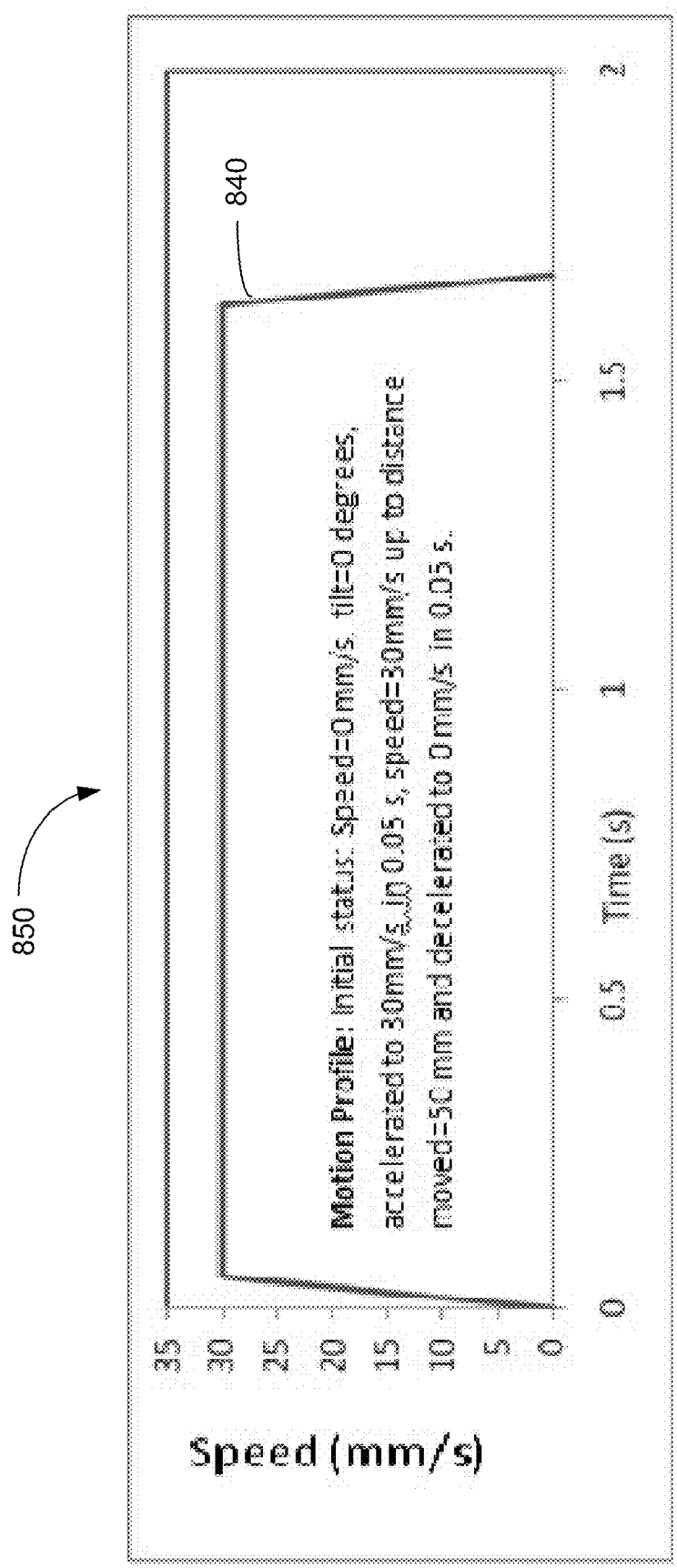
FIG. 8D illustrates calculated speed as a function of time for the first test results for both accelerometers for measurement of co-existing tilt and linear horizontal acceleration using the exemplary motion-sensing device of FIG. 3 in the motion stage of FIG. 7 in a dynamic environment, for the case of no tilt with positive and negative accelerations, according to a preferred embodiment of the present invention.

FIG. 8C illustrates calculated distance 830 as a function of time for the first test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of no tilt α with positive and negative accelerations a, according to a preferred embodiment of the present invention. FIG. 8C graphs the distance 830 measured by the motion-sensing device 300 and calculated with Eq. (6) with the motion profile 850 as shown in FIG. 8D. The measured distance 830 of 50 mm agrees very well with the motion control setting of 50 mm with some tolerance. Please note the direction of acceleration a, speed 840 and the moving distance 830 sensed by the motion-sensing device 300 are just opposite compared to the settings of the motion profile 850. This difference will not be mentioned again hereafter in this article.

FIG. 8D illustrates calculated speed 840 as a function of time for the first test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of no tilt α with positive and negative accelerations a, according to a preferred embodiment of the present invention. While maintaining a zero tilt α, the motion profile 850 provides acceleration from a speed of zero to 30 mm/s in 0.05 seconds, which speed is maintained constant until a distance 830 of 50 mm has been reached, then provides deceleration to zero mm/s in 0.05 seconds.

Figure 9A:
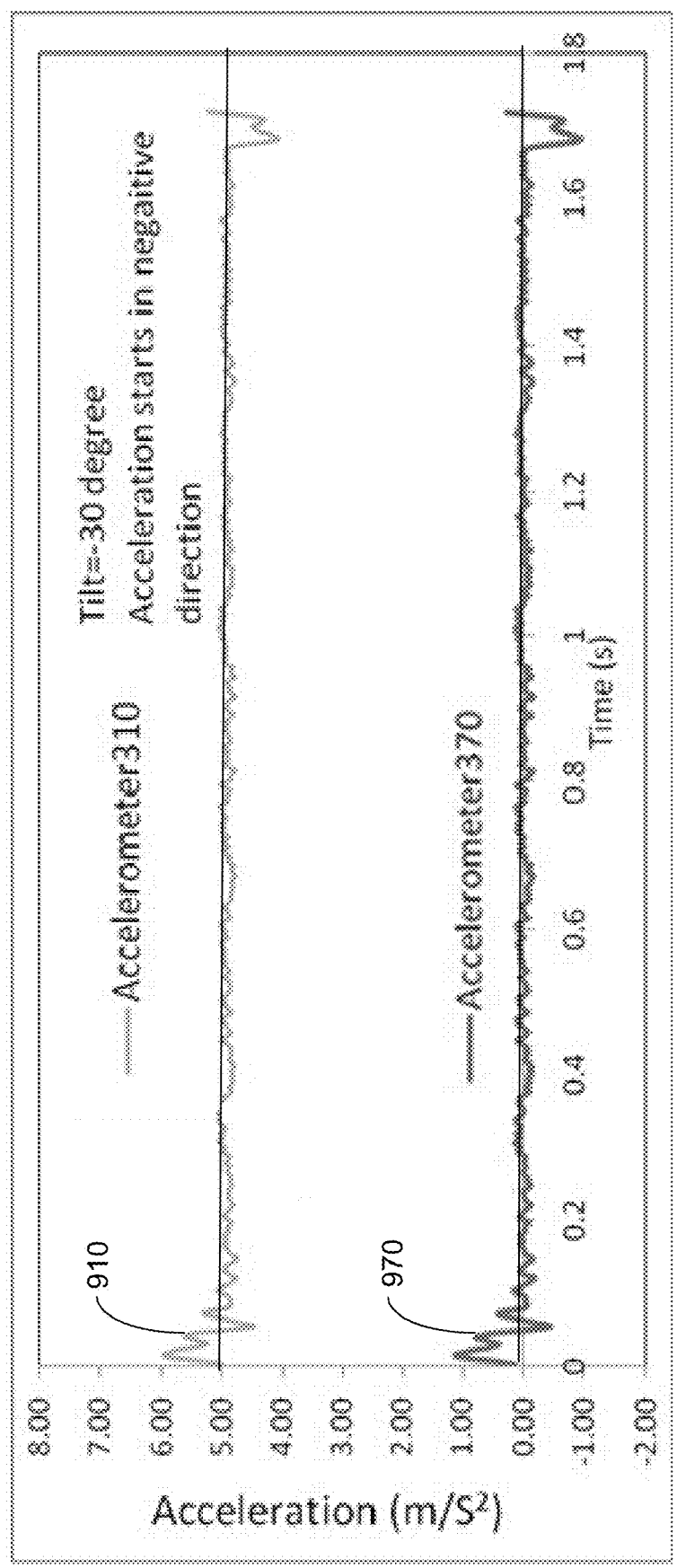
FIG. 9A illustrates second test results from both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.

FIG. 9A illustrates second test results from both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of –30° tilt α with negative and positive linear accelerations a, according to a preferred embodiment of the present invention. FIG. 9A graphs acceleration readings 910 and 970 measured by the accelerometer 310 and 370, respectively, under the action of co-existing tilt α of –30 degrees and linear horizontal acceleration a, with the motion stage 700 controlled by the motion profile 950 as shown in FIG. 9D. The readings of accelerometer 310 and 370 are no longer identical, as compared to readings 810 and 870 in FIG. 8A where there is no tilt α acting on the system, and so readings 910 and 970 are separated by a certain space. The reason for that is because the reading 970 of accelerometer 370 is caused by linear horizontal acceleration a only and is not changed by tilt α but the reading 910 of accelerometer 310 is caused by both linear horizontal acceleration a and tilt α and, therefore, the curve of the reading 910 of accelerometer 310 is moved lower or higher depending on if the tilt α direction is positive or negative.

Figure 9B:
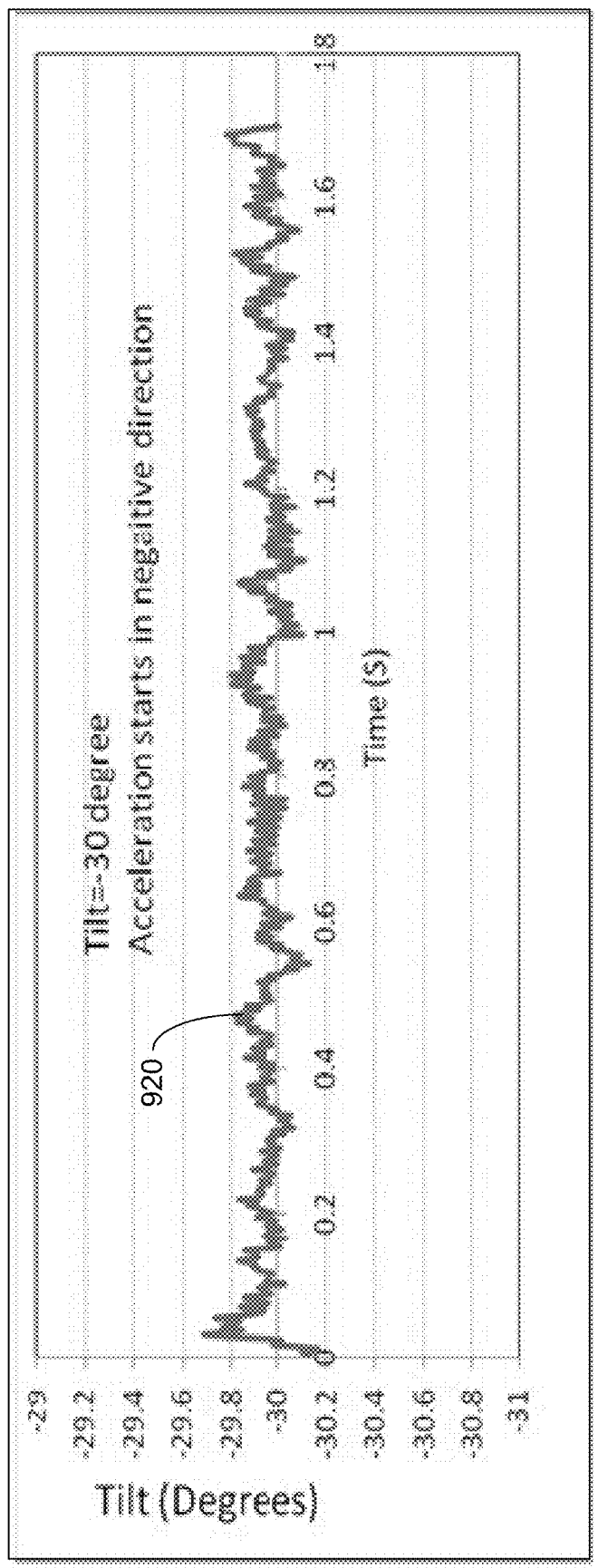
FIG. 9B illustrates second test results for the motion-sensing device for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.

FIG. 9B illustrates second test results for the motion-sensing device 300 for measurement of co-existing tilt α and linear horizontal acceleration a using the exemplary motion-sensing device 300 of FIG. 3 in the motion stage 700 of FIG. 7 in a dynamic environment, for the case of –30° tilt α with negative and positive linear accelerations a, according to a preferred embodiment of the present invention. The FIG. 9B graphs the data 920 for tilt α calculated with Eq. (3).

Figure 9C:
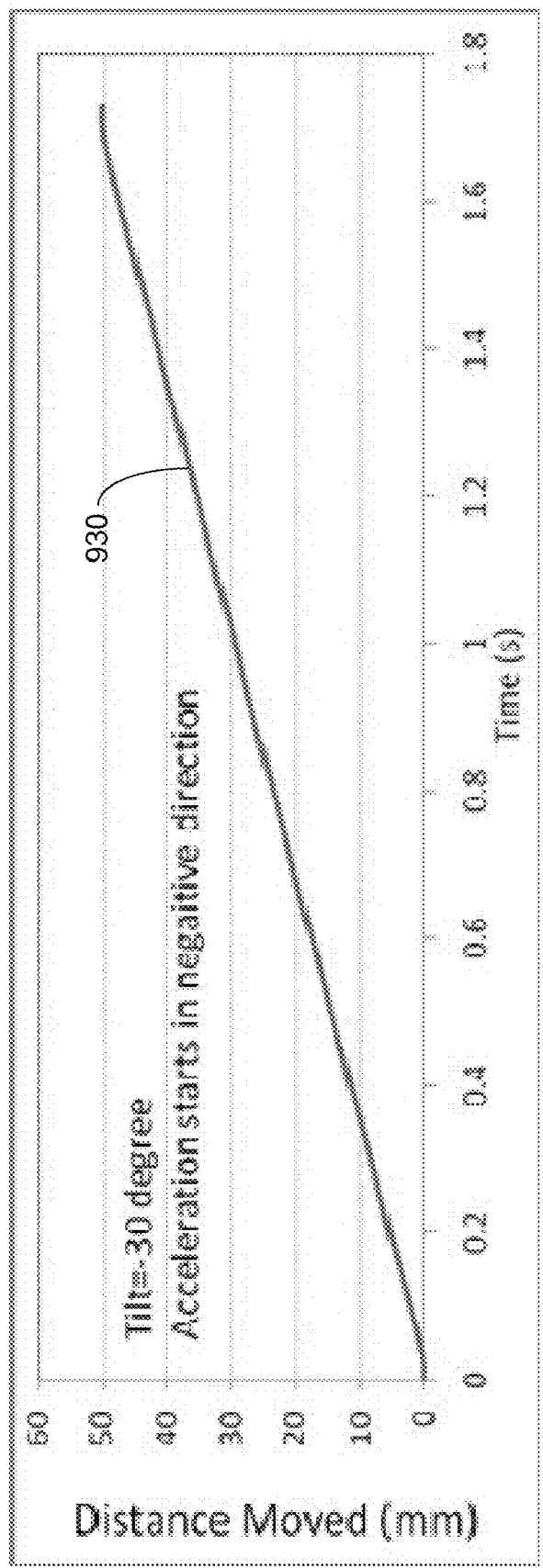
FIG. 9C illustrates calculated distance as a function of time for the second test results for both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.
Figure 9D:
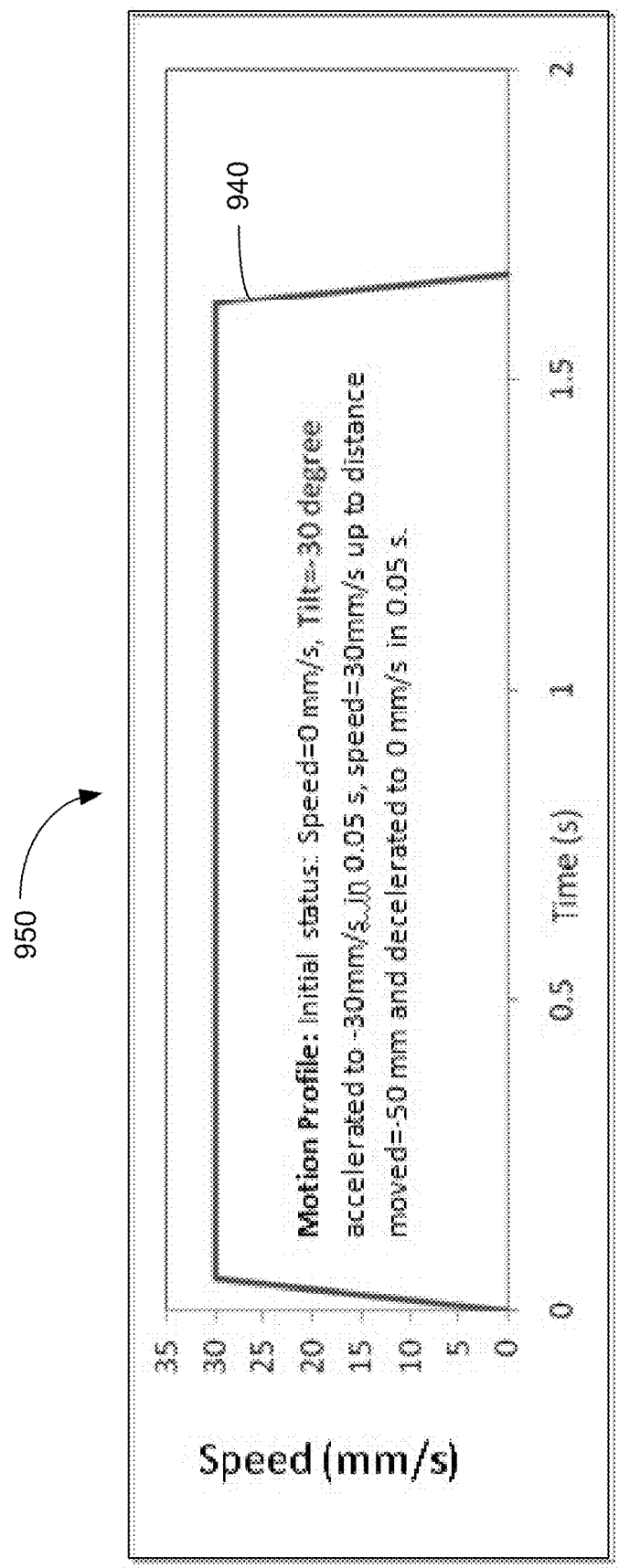
FIG. 9D illustrates calculated speed as a function of time for the second test results for both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.

FIG. 9C illustrates calculated distance 930 as a function of time for the second test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of –30° tilt α with negative and positive linear accelerations a, according to a preferred embodiment of the present invention FIG. 9C graphs the distance 930 calculated by Eq. (6). Again, the result of the dynamic environment measurement agrees very well with the motion profile 950 of FIG. 9D.

FIG. 9D illustrates calculated speed 940 as a function of time for the second test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of –30° tilt α with negative and positive linear accelerations a, according to a preferred embodiment of the present invention. While maintaining a –30° tilt α, the motion profile 950 provides horizontal linear acceleration a from a speed of zero to 30 mm/s in 0.05 seconds, which speed is maintained constant until a distance 930 of 50 mm has been reached, then provides deceleration to zero mm/s in 0.05 seconds.

Figure 10A:
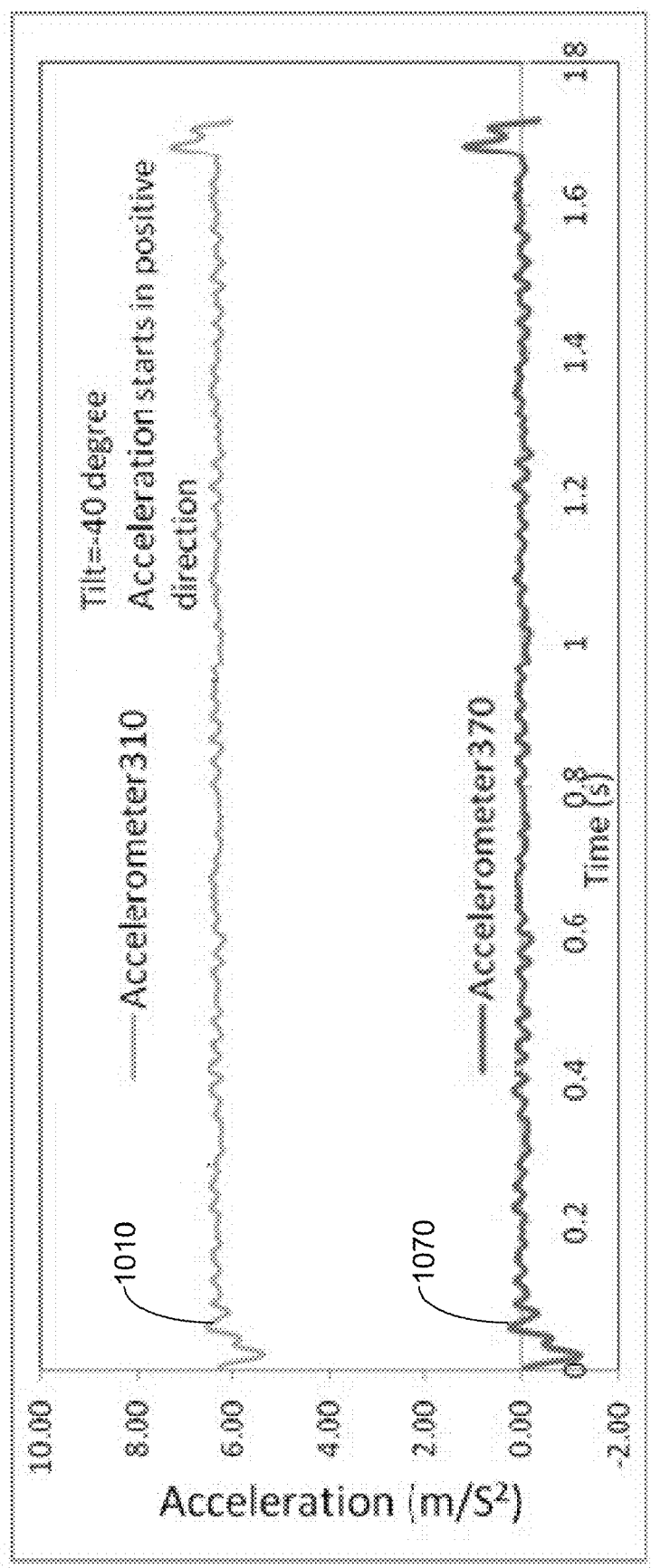
FIG. 10A illustrates third test results from both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 10A illustrates third test results from both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of –40° tilt α with positive and negative accelerations a, according to a preferred embodiment of the present invention. FIG. 10A graphs the measured accelerations 1010 and 1070 from accelerometers 310 and 370, respectively, resulting from the motion determined by the motion profile 1050 of FIG. 10D with a tilt of –40 degrees. Again, the result of the dynamic environment measurement agrees very well with the motion profile 1050 of FIG. 10D with some tolerance. The space between the acceleration curves 1010 and 1070 of accelerometers 310 and 370, respectively, becomes wider (growing from 5 m/s² to 6 m/s²) while the location of the curve of accelerometer 370 is still the same as shown in FIG. 9A.

Figure 10B:
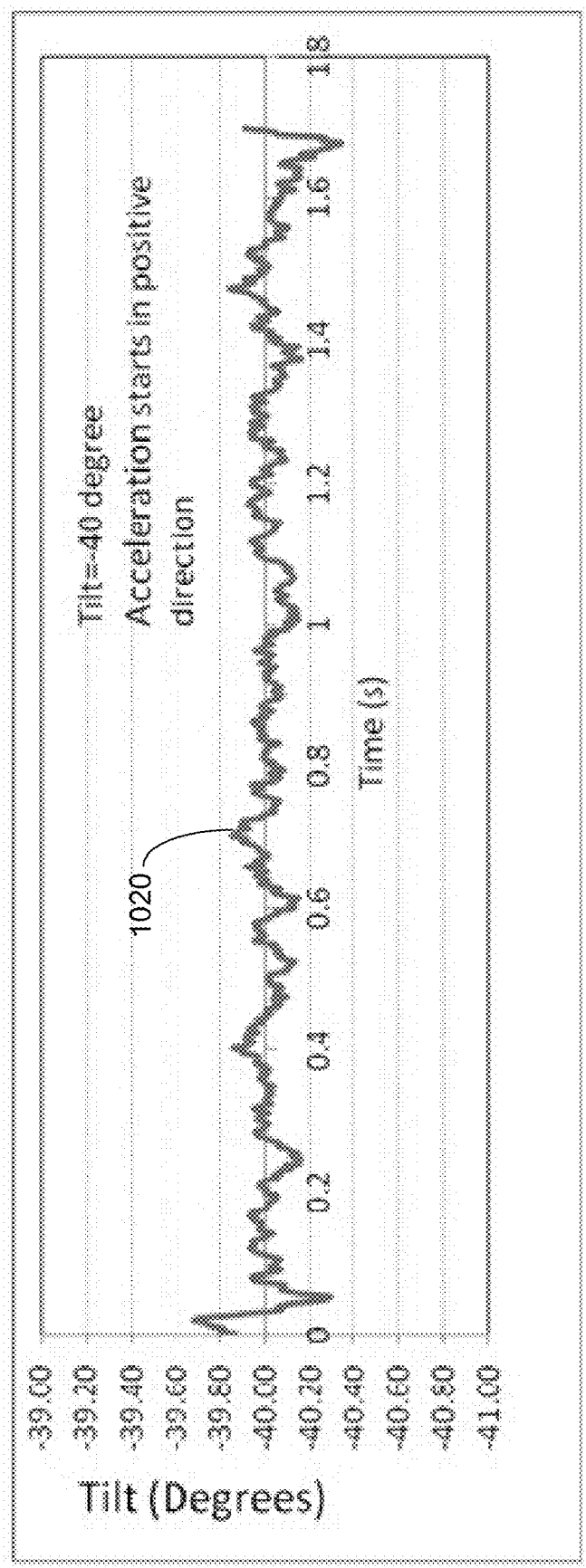
FIG. 10B illustrates third test results for the motion-sensing device for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 10B illustrates third test results for the motion-sensing device 300 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. FIG. 10B graphs the data 1020 for tilt α calculated with Eq. (3). Tilt measurement 1020 indicates a tilt α of −40° to within a tolerance of less than 0.4°.

Figure 10C:
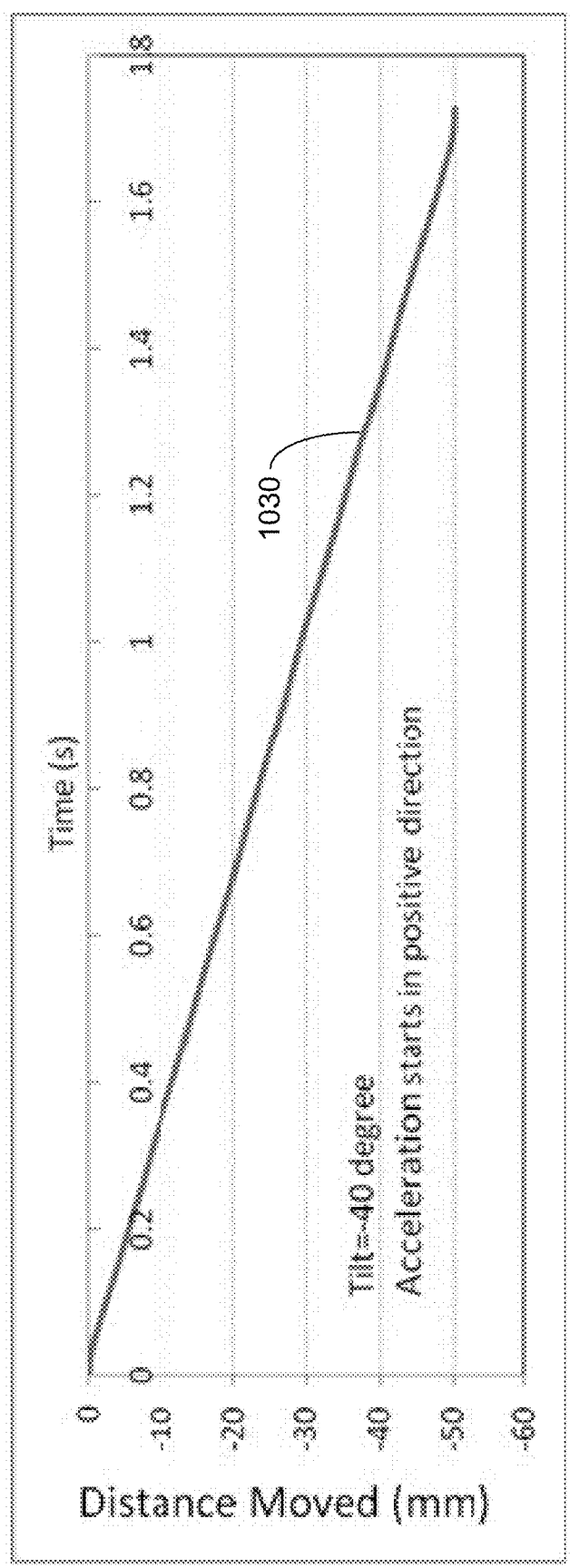
FIG. 10C illustrates calculated distance as a function of time for the third test results for both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 10C illustrates calculated distance 1030 as a function of time for the third test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. FIG. 10C graphs the distance 1030 calculated by Eq. (6). Again, the result of the dynamic environment measurement agrees very well with the motion profile 1050 of FIG. 10D.

Figure 10D:
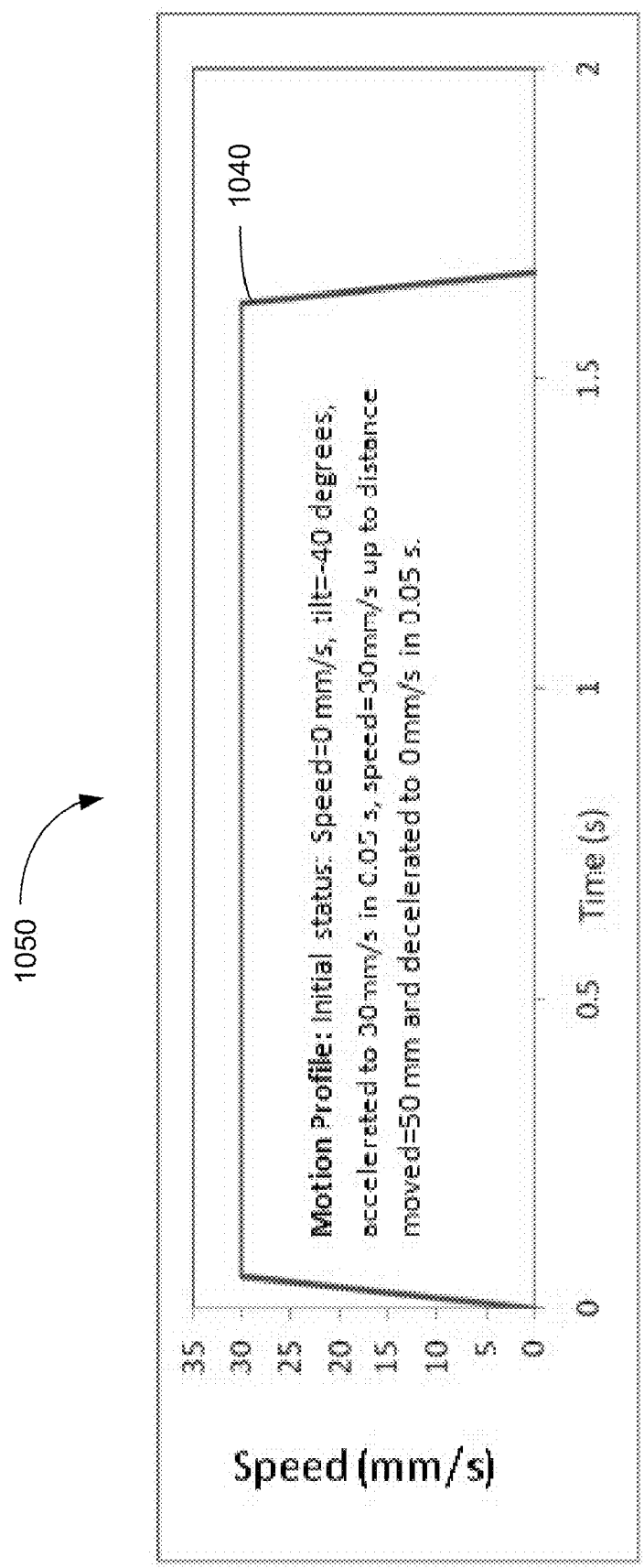
FIG. 10D illustrates calculated speed as a function of time for the third test results for both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 10D illustrates calculated speed 1040 as a function of time for the third test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. While maintaining a −40° tilt α, the motion profile 1050 provides horizontal linear acceleration a from a speed of zero to 30 mm/s in 0.05 seconds, which speed is maintained constant until a distance 1030 of 50 mm has been reached, then provides deceleration to zero mm/s in 0.05 seconds.

Figure 11A:
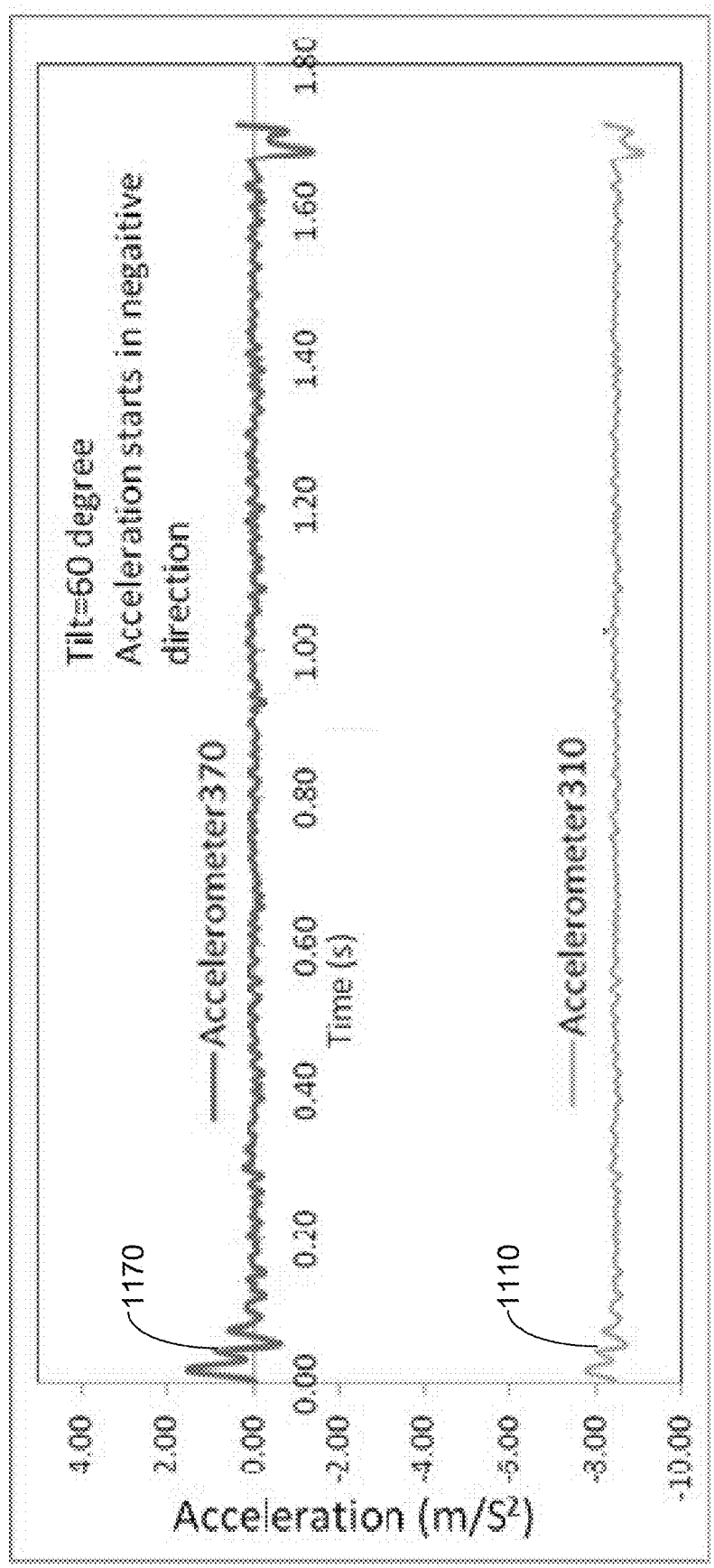
FIG. 11A illustrates fourth test results from both accelerometers for measurement of co-existing tilt and linear horizontal acceleration using the exemplary motion-sensing device of FIG. 3 in the motion stage of FIG. 7 in a dynamic environment, for the case of 60° tilt with negative and positive linear accelerations, according to a preferred embodiment of the present invention.

FIG. 11A illustrates fourth test results from both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of 60° tilt α with positive and negative accelerations a, according to a preferred embodiment of the present invention. FIG. 11A graphs the measured accelerations 1110 and 1170 from accelerometers 310 and 370, respectively, resulting from the motion determined by the motion profile 1150 of FIG. 11D with a tilt α of 60 degrees. Again, the result of the dynamic environment measurement agrees very well with the motion profile 1150 of FIG. 11D with some tolerance. The space between the acceleration curves 1110 and 1170 of accelerometers 310 and 370, respectively, becomes wider (growing from 5 m/s² to 8 m/s²) while the location of the curve of accelerometer 370 is still the same as shown in FIG. 9A and FIG. 10A.

Figure 11B:
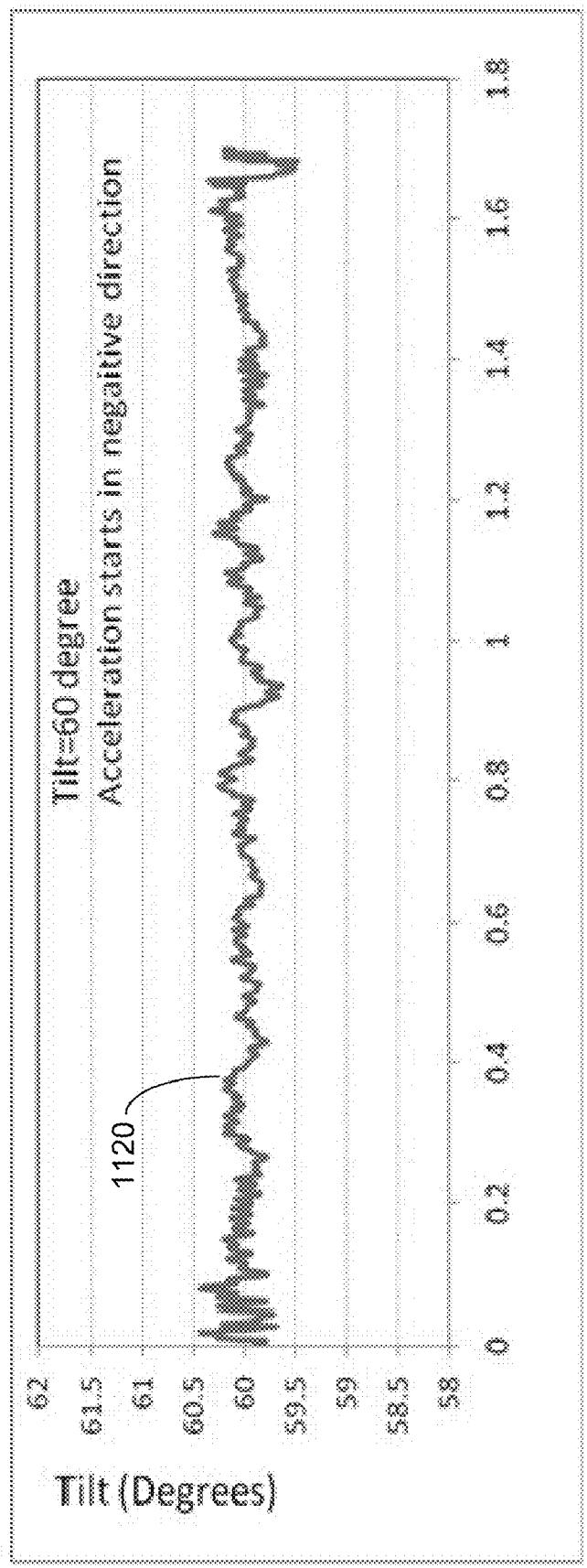
FIG. 11B illustrates fourth test results for the motion-sensing device for measurement of co-existing tilt and linear horizontal acceleration using the exemplary motion-sensing device of FIG. 3 in the motion stage of FIG. 7 in a dynamic environment, for the case of 60° tilt with negative and positive linear accelerations, according to a preferred embodiment of the present invention.

FIG. 11B illustrates fourth test results for the motion-sensing device 300 for measurement of co-existing tilt α and linear horizontal acceleration a using the exemplary motion-sensing device 300 of FIG. 3 in the motion stage 700 of FIG. 7 in a dynamic environment, for the case of 60° tilt α with negative and positive linear accelerations a, according to a preferred embodiment of the present invention. FIG. 11B graphs the data 1120 for tilt α calculated with Eq. (3). Tilt measurement 1120 indicates a tilt α of 60° to within a tolerance of less than 0.5°.

Figure 11C:
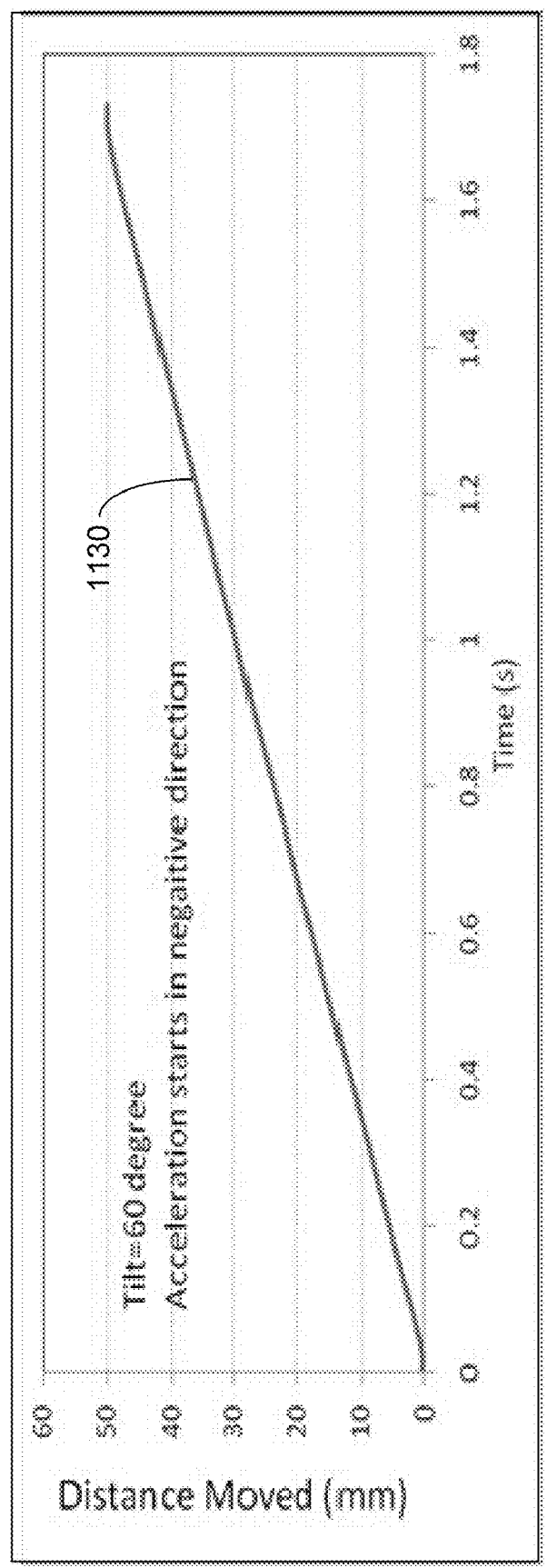
FIG. 11C illustrates calculated distance as a function of time for the fourth test results for both accelerometers for measurement of co-existing tilt and linear horizontal acceleration using the exemplary motion-sensing device of FIG. 3 in the motion stage of FIG. 7 in a dynamic environment, for the case of 60° tilt with negative and positive linear accelerations, according to a preferred embodiment of the present invention.

FIG. 11C illustrates calculated distance 1130 as a function of time for the fourth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of 60° tilt α with negative and positive linear accelerations a, according to a preferred embodiment of the present invention. FIG. 11C graphs the distance 1130 calculated by Eq. (6). Again, the result of the dynamic environment measurement agrees very well with the motion profile 1150 of FIG. 11D.

Figure 11D:
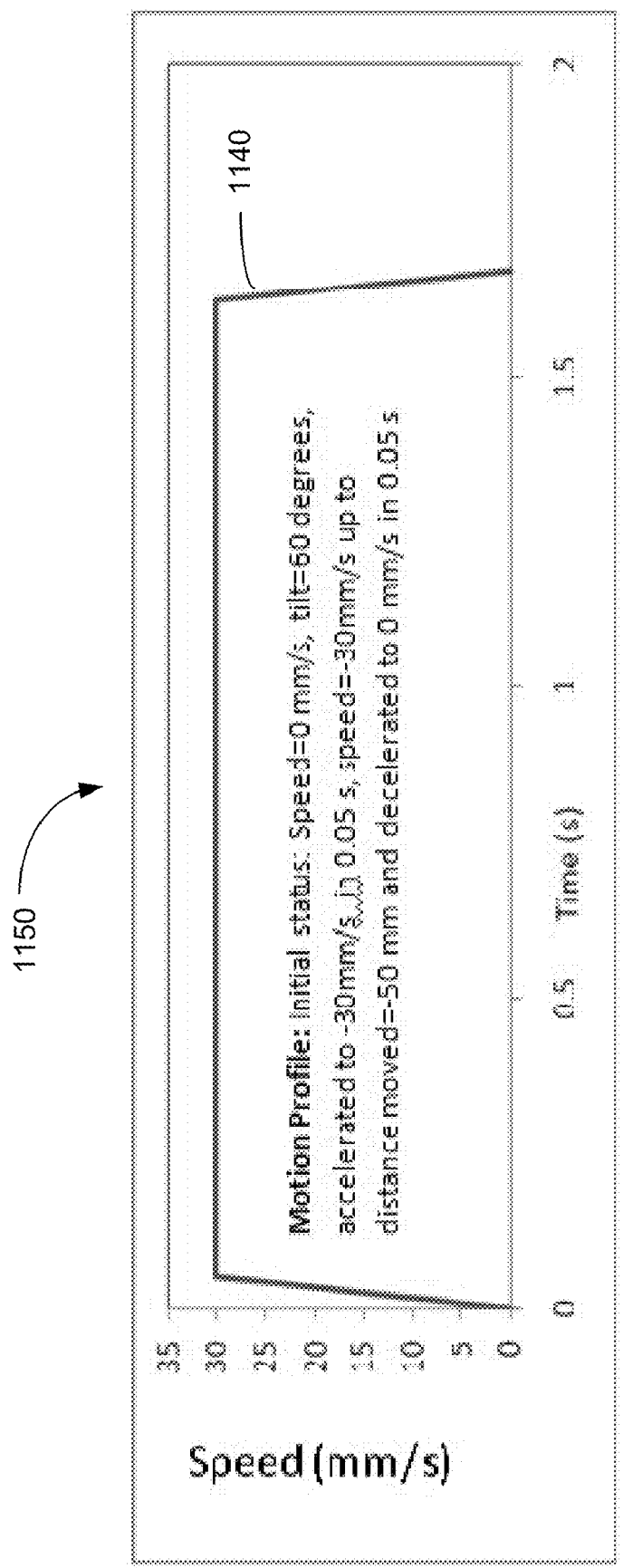
FIG. 11D illustrates calculated speed as a function of time for the fourth test results for both accelerometers for measurement of co-existing tilt and linear horizontal acceleration using the exemplary motion-sensing device of FIG. 3 in the motion stage of FIG. 7 in a dynamic environment, for the case of 60° tilt with negative and positive linear accelerations, according to a preferred embodiment of the present invention.

FIG. 11D illustrates calculated speed 1140 as a function of time for the fourth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of 60° tilt α with negative and positive linear accelerations a, according to a preferred embodiment of the present invention. While maintaining a 60° tilt α, the motion profile 1150 provides horizontal linear acceleration a from a speed of zero to 30 mm/s in 0.05 seconds, which speed is maintained constant until a distance 1130 of 50 mm has been reached, then provides deceleration to zero mm/s in 0.05 seconds.

Again, the result of the dynamic environment measurement agrees very well with the motion profile 1150 of FIG. 11D with some tolerance. The space between the acceleration curves 1110 and 1170 of accelerometers 310 and 370, respectively, becomes even wider while the location of the curve 1170 of accelerometer 370 is still not sensitive to the tilt α as shown in FIG. 11A.

Figure 12A:
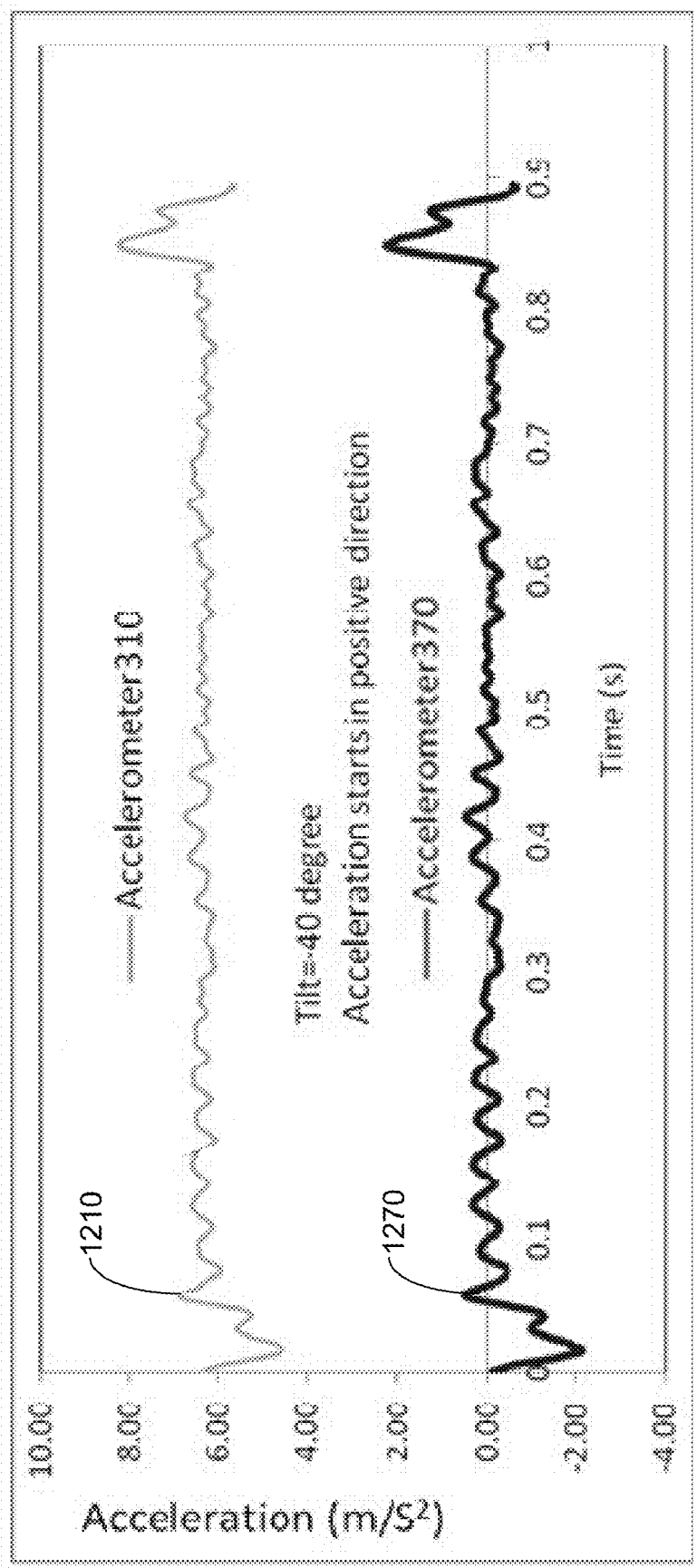
FIG. 12A illustrates fifth test results from both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 12A illustrates fifth test results from both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −40° tilt α with positive and negative accelerations a, according to a preferred embodiment of the present invention. FIG. 12A graphs the measured accelerations 1210 and 1270 from accelerometers 310 and 370, respectively, resulting from the motion determined by the motion profile 1250 of FIG. 12D with a tilt α of −40 degrees and with higher acceleration a and higher speed 1225. Again, the result of the dynamic environment measurement agrees very well with the motion profile 1250 of FIG. 12D with some tolerance. The space between the acceleration curves 1210 and 1270 of accelerometers 310 and 370, respectively, becomes narrower compared to fourth test results in FIG. 11A, while the location of the curve of accelerometer 370 is still the same as shown in FIG. 9A, FIG. 10A, and FIG. 11A.

Figure 12B:
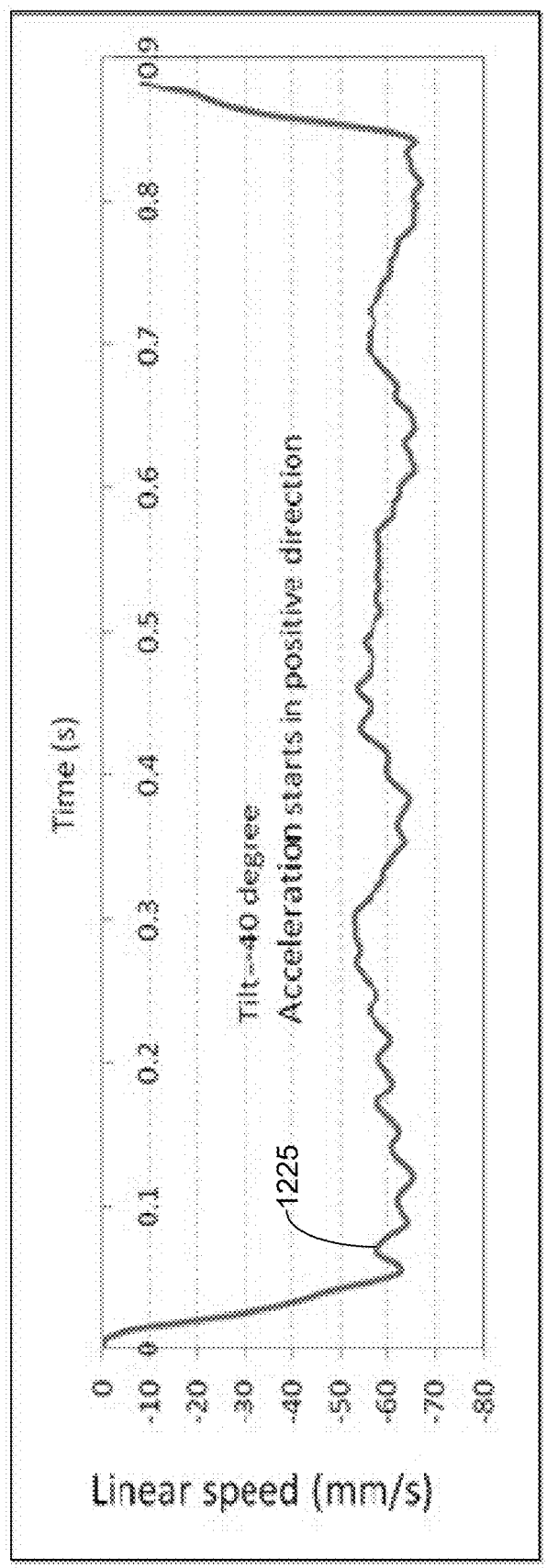
FIG. 12B illustrates fifth test results for the motion-sensing device for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

FIG. 12B illustrates fifth test results for the motion-sensing device 300 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. FIG. 12B demonstrates the speed 1225 curve calculated with Eq. (5) and agrees with the motion profile 1250 of FIG. 12D. There are some small differences between the two profiles. FIG. 12D is a perfectly theoretical one while the FIG. 12B is a practical one measured by experiment. Using optical decoder feedback during the experiment, the differences were confirmed to be caused by the deviation of motion control of the motion stages 700 from perfect theoretical motion profile 1250 of FIG. 12D. The moving distance 1230 is calculated by Eq. (6) or the integration from Eq. (5):

$$S = \int_0^{t_1} v \, dt \tag{7}$$

The calculated distance 1230, however, almost perfectly matches with the motion control profile 1250. FIG. 12B illustrates the speed curve 1125 calculated with Eq. (5) and agrees with the motion profile 1250 of FIG. 12D. There are some small differences between the two profiles. FIG. 12D illustrates a perfectly theoretical motion profile 1250 while the FIG. 12B illustrates an actual motion profile 1225 measured in the experiment. Using optical decoder feedback during the experiment, the differences were confirmed to be caused by the deviation of motion control of the motion stages 700 from perfect theoretical motion profile 1250 of FIG. 12D. The moving distance 1230 is calculated by Eq. (6) or the integration from Eq. (5)

$$S = \int_0^{t_1} v \, dt \tag{7}$$

Figure 12C:
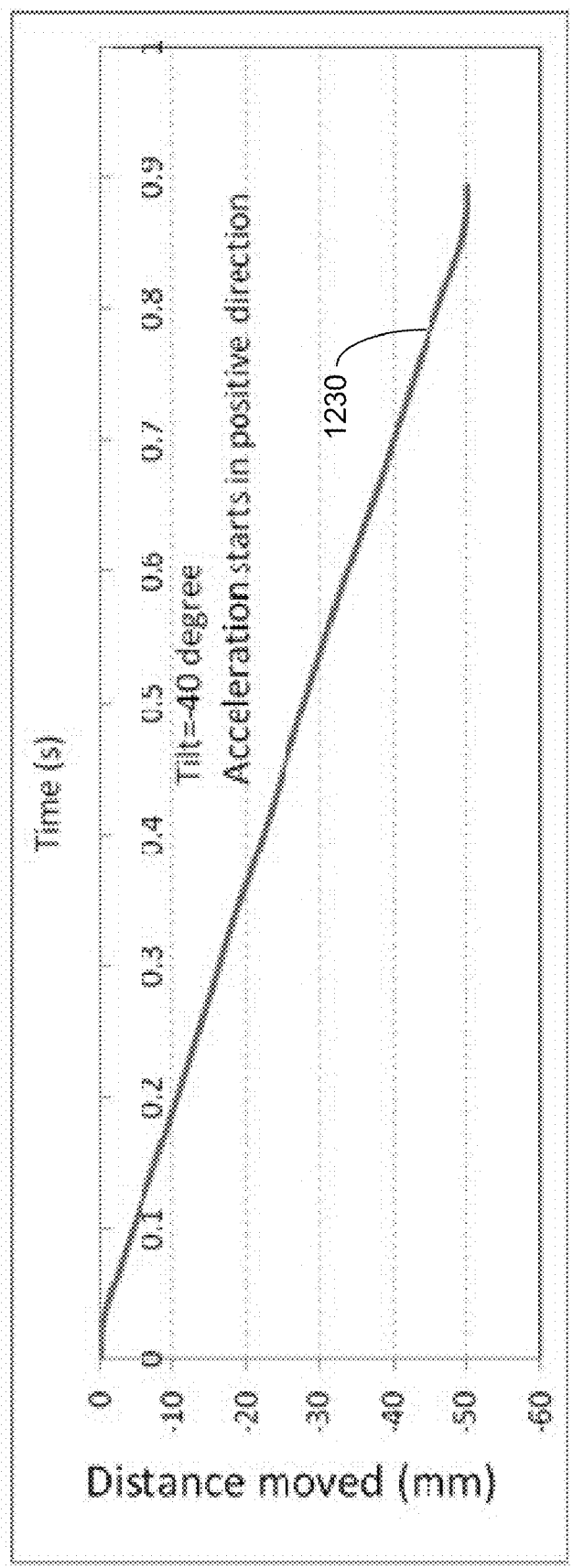
FIG. 12C illustrates calculated distance as a function of time for the fifth test results for both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.
Figure 12D:
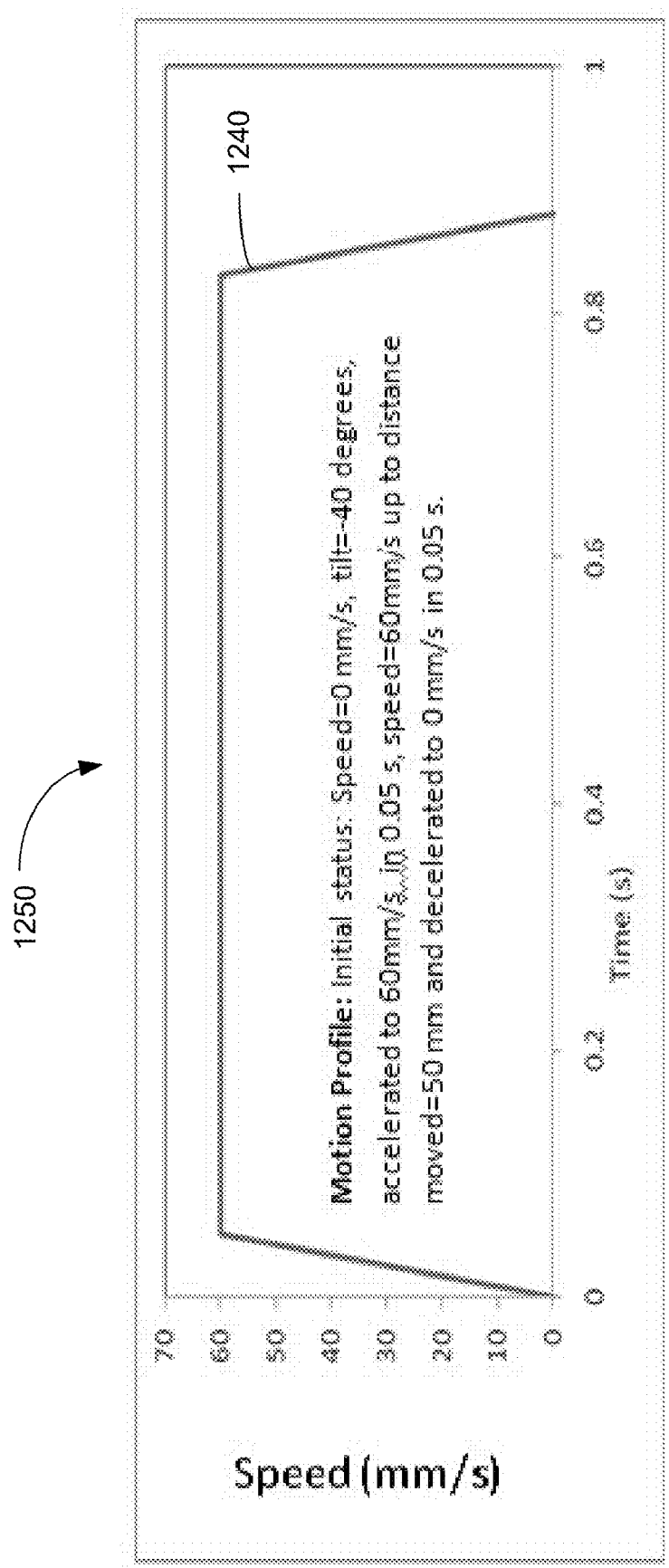
FIG. 12D illustrates calculated speed as a function of time for the fifth test results for both accelerometers for measurement of co-existing tilt and linear horizontal acceleration using the exemplary motion-sensing device of FIG. 3 in the motion stage of FIG. 7 in a dynamic environment, for the case of −40° tilt with positive and negative accelerations, according to a preferred embodiment of the present invention.

The calculated distance 1230, however, almost perfectly matches with the motion control profile 1250 of FIG. 12D, as shown in FIG. 12C. With the speed 1225 profile measured as shown in FIG. 12B, the average acceleration in different periods of the motion can be determined by the slope $$\bar{a} = \frac{\Delta v}{\Delta t} \tag{8}$$

Based on Eq. (8), the average acceleration calculated from FIG. 12B, during the 0.05 second of the period when the system is accelerated from v=0 to v=60 mm/s, is $$\bar{a} \cong -0.122 \, g = -1.20 \, m/s^2$$

It can also be readily demonstrated that the absolute value of the average acceleration for the measurements of FIG. 8A-8D, FIG. 9A-9D, FIG. 10A-10D and FIG. 11A-11D is $$|\bar{a}| \cong 0.0612 \, g = 0.60 \, m/s^2,$$

during the speed-up period of the first 0.05 second. The acceleration may be positive or negative depending on the slope of the speed profiles in those figures.

FIG. 12C illustrates calculated distance 1230 as a function of time for the fifth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. FIG. 12C graphs the distance 1130 calculated by Eq. (6). Again, the result of the dynamic environment measurement agrees very well with the motion profile 1250 of FIG. 12D.

FIG. 12D illustrates calculated speed 1240 as a function of time for the fifth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −40° tilt α with negative and positive linear accelerations a, according to a preferred embodiment of the present invention. While maintaining a −40° tilt α, the motion profile 1250 provides horizontal linear acceleration a from a speed of zero to 30 mm/s in 0.05 seconds, which speed is maintained constant until a distance 1230 of 50 mm has been reached, then provides deceleration to zero mm/s in 0.05 seconds.

Figure 13A:
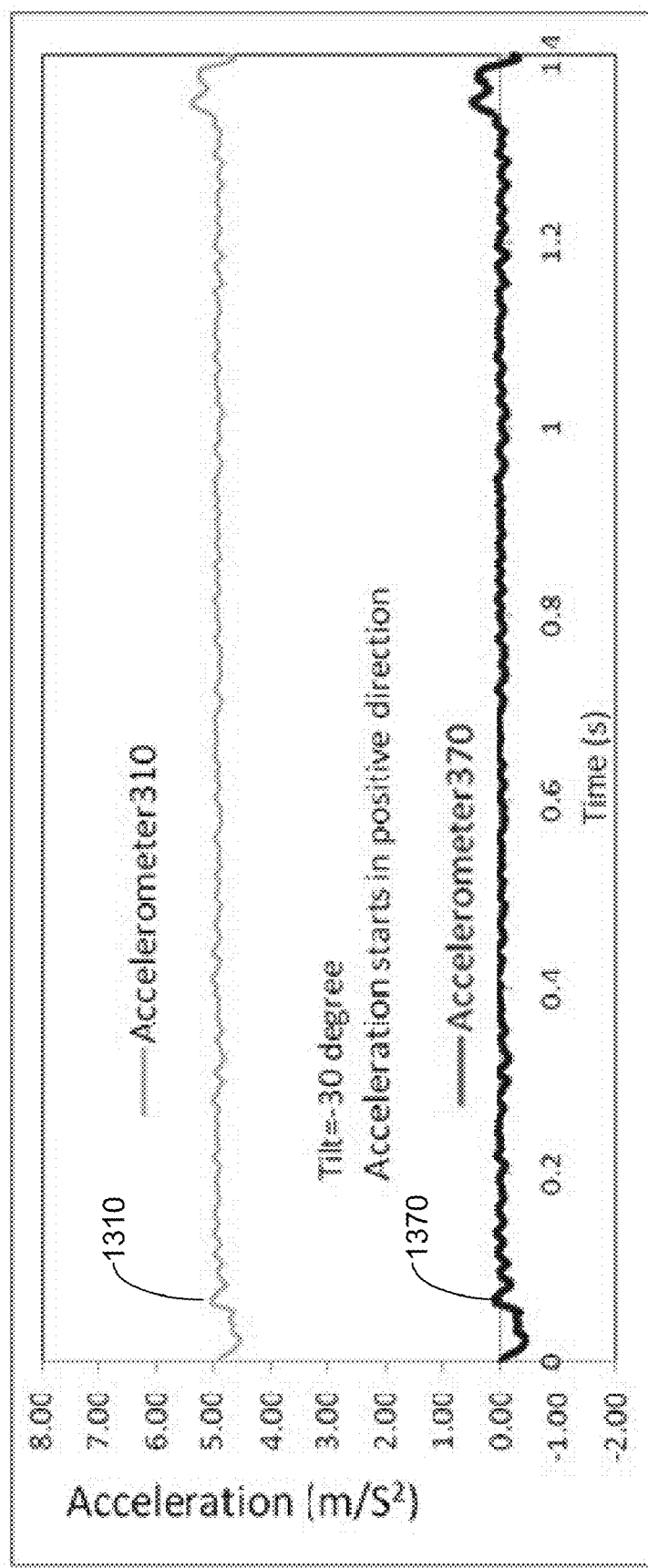
FIG. 13A illustrates sixth test results from both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.

FIG. 13A illustrates sixth test results from both accelerometers for measurement of co-existing tilt α and linear horizontal acceleration a using the exemplary motion-sensing device 300 of FIG. 3 in the motion stage 700 of FIG. 7 in a dynamic environment, for the case of −30° tilt α with positive and negative linear accelerations a, according to a preferred embodiment of the present invention. FIG. 13A graphs the measured accelerations 1310 and 1370 from accelerometers 310 and 370, respectively, resulting from the motion determined by the motion profile 1350 of FIG. 13E with a tilt α of −30 degrees and with smaller linear horizontal acceleration and lower speed $$\bar{a} \cong -0.306 \, g = -0.30 \, m/s^2.$$

Figure 13B:
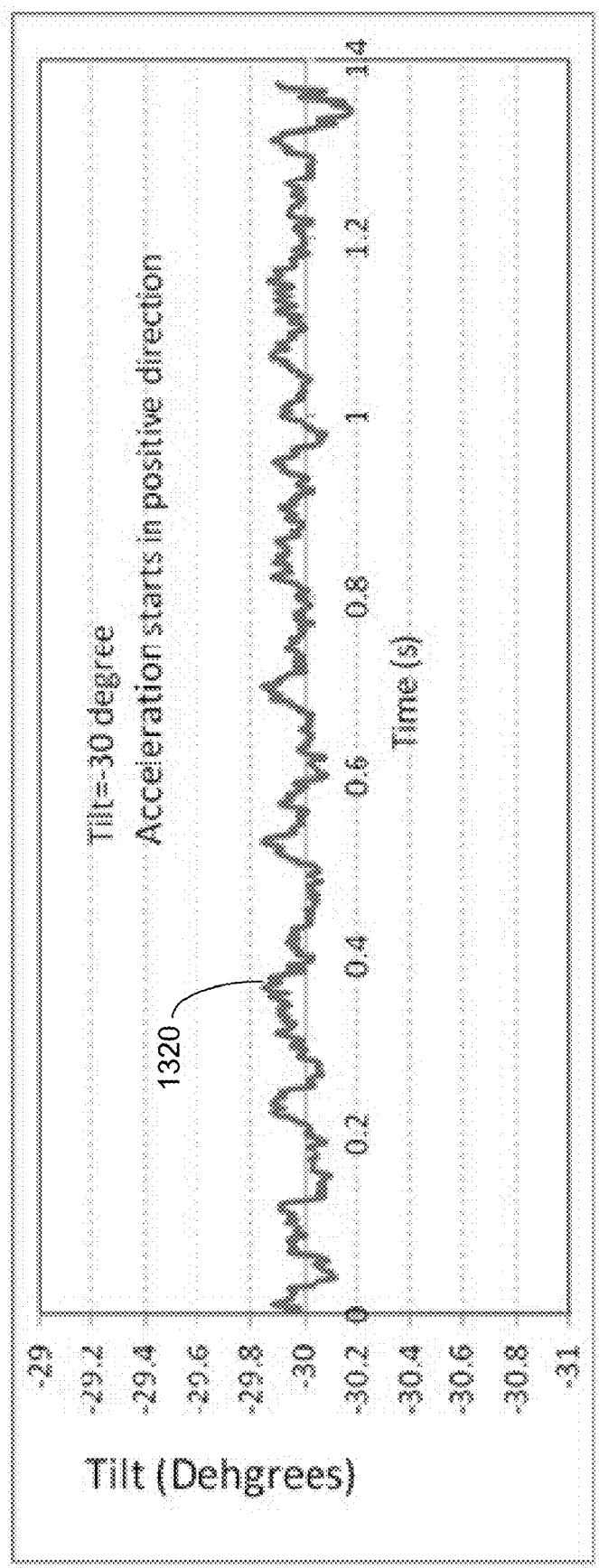
FIG. 13B illustrates sixth test results for the tilt sensor for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.
Figure 13C:
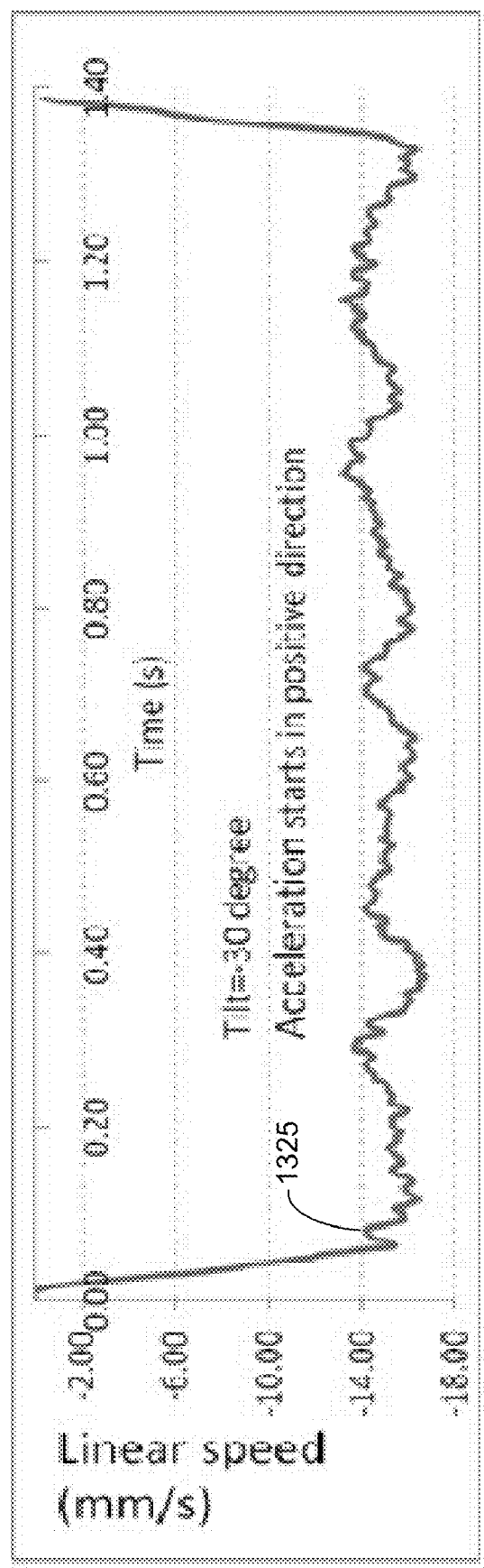
FIG. 13C illustrates calculated linear speed as a function of time for the sixth test results for both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.
Figure 13D:
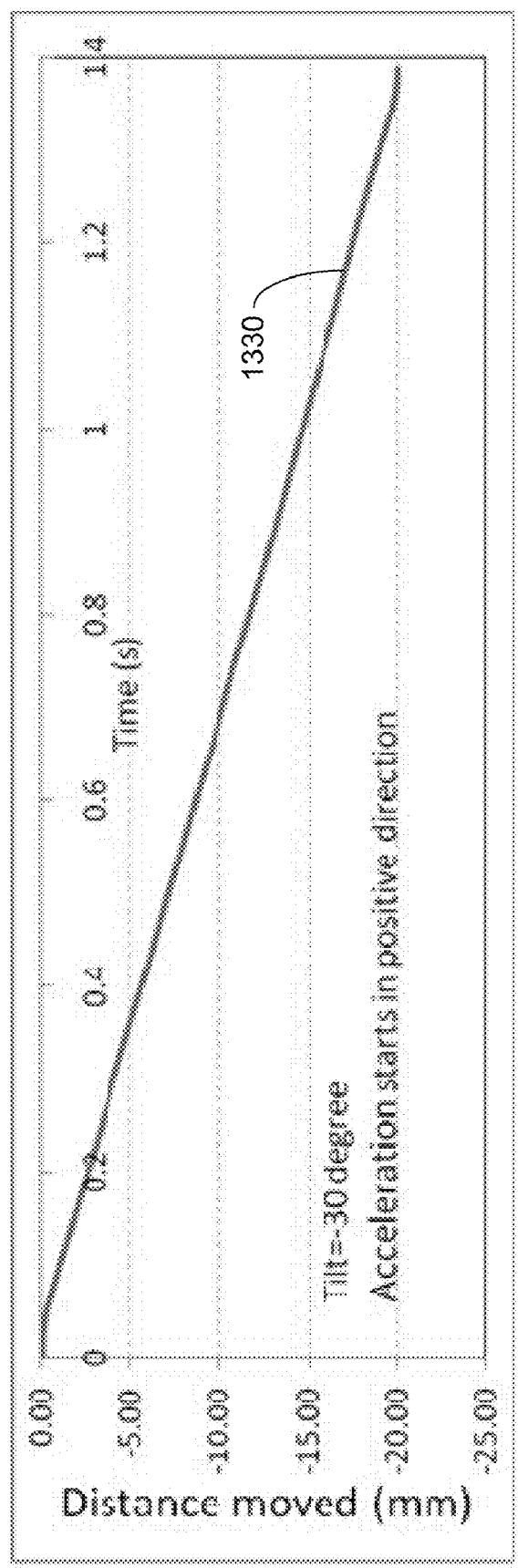
FIG. 13D illustrates calculated distance as a function of time for the sixth test results for both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.
Figure 13E:
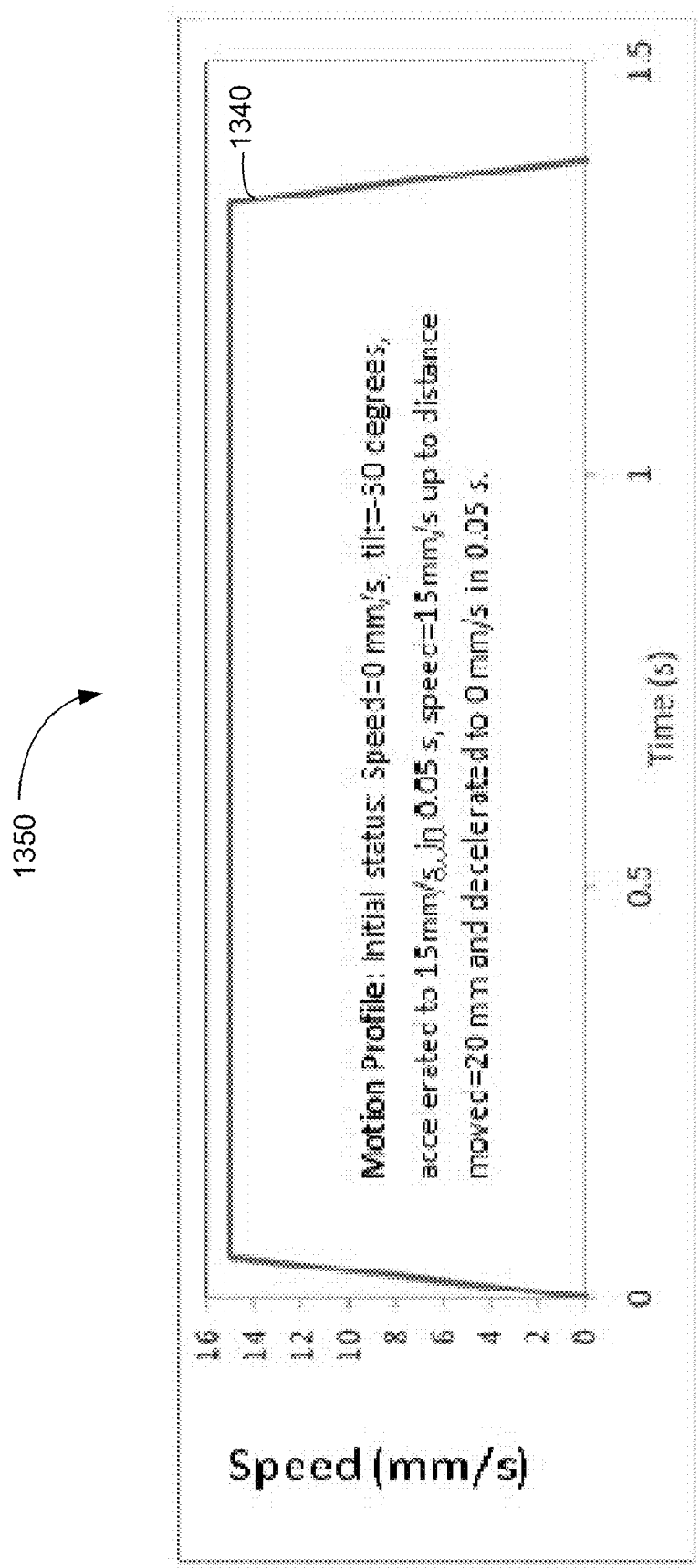
FIG. 13E illustrates the motion profile of speed as a function of time for the sixth test results for both accelerometers for measurement of co-existing tilt and linear horizontal acceleration using the exemplary motion-sensing device of FIG. 3 in the motion stage of FIG. 7 in a dynamic environment, for the case of −30° tilt with negative and positive linear accelerations, according to a preferred embodiment of the present invention.

Again, the result of the dynamic environment measurement agrees very well with the motion profile 1350 of FIG. 13E with some tolerance.

FIG. 13B illustrates sixth test results for the motion-sensing device 300 for measurement of co-existing tilt α and linear horizontal acceleration a using the exemplary motion-sensing device 300 of FIG. 3 in the motion stage 700 of FIG. 7 in a dynamic environment, for the case of −30° tilt α with positive and negative linear accelerations, according to a preferred embodiment of the present invention. The calculated tilt α data 1320 illustrates a reading of −30° within a tolerance of 0.2°, which is in good agreement with the ideal tilt α of −30°.

FIG. 13C illustrates calculated linear speed 1325 as a function of time for the sixth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −30° tilt α with positive and negative linear accelerations a, according to a preferred embodiment of the present invention. The calculated linear speed 1325 is in good agreement with the ideal motion profile 1350 of FIG. 13E.

FIG. 13D illustrates calculated distance 1330 as a function of time for the sixth test results for both accelerometers 310 and 370 for measurement of co-existing tilt α and linear horizontal acceleration a using the exemplary motion-sensing device 300 of FIG. 3 in the motion stage 700 of FIG. 7 in a dynamic environment, for the case of −30° tilt α with positive and negative linear accelerations a, according to a preferred embodiment of the present invention. FIG. 13D graphs the distance 1330 calculated by Eq. (6). Again, the result of the dynamic environment measurement agrees very well with the motion profile 1350 of FIG. 13E.

FIG. 13E illustrates the motion profile 1350 of speed 1340 as a function of time for the sixth test results for both accelerometers 310 and 370 for measurement of co-existing tilt α and linear horizontal accelerations a using the exemplary motion-sensing device 300 of FIG. 3 in the motion stage 700 of FIG. 7 in a dynamic environment, for the case of −30° tilt α with positive and negative linear accelerations a, according to a preferred embodiment of the present invention. While maintaining a −30° tilt α, the motion profile 1350 provides horizontal linear acceleration a from a speed of zero to 15 mm/s in 0.05 seconds, which speed is maintained constant until a distance 1330 of 20 mm has been reached, then provides deceleration to zero mm/s in 0.05 seconds.

The motion-sensing device 300 is composed of two accelerometers 310 and 370 made with standard MEMS processing and one pendulum 305 and, therefore obviously, the system 300 can be scaled down and made with MEMS techniques with the flexible coupling wire 360 of the pendulum preferably made with polymer MEMS material. The two accelerometers 310 and 370 and the pendulum system 305 and other components can be embedded into one single chip. The critical damping fluid 395 can be designed into an air damping mechanism in narrow gaps with well known techniques used in MEMS.

Figure 14:
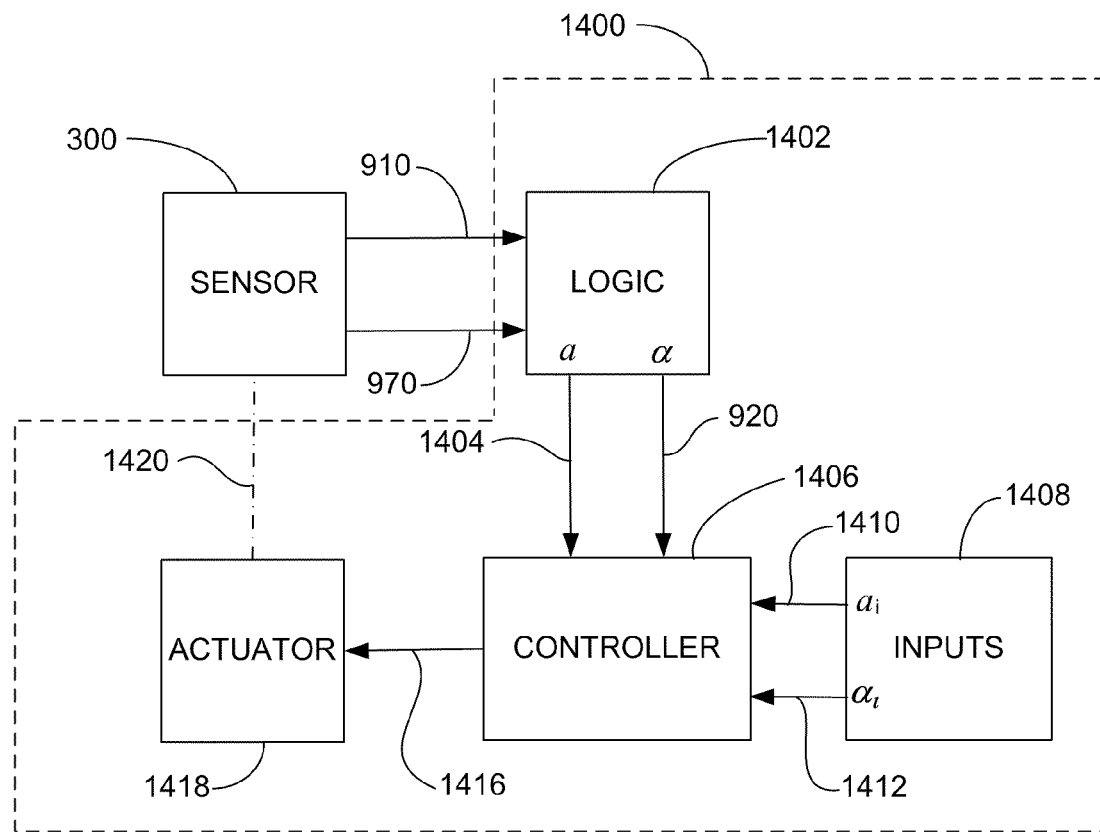
FIG. 14 is a diagrammatic illustration of the exemplary motion sensing device communicatively coupled to an exemplary control system, according to a preferred embodiment of the present invention.

FIG. 14 is a diagrammatic illustration of the exemplary embodiment of the motion sensing device 300 communicatively coupled to an exemplary control system 1400, according to a preferred embodiment of the present invention.

Motion-sensing device 300 produces exemplary accelerometer outputs 910 and 970 from accelerometer 310 and 370, respectively. Logic 1402 determines linear acceleration a from the output of accelerometer 370 using Eq. (1) or Eq. (2) and determines tilt α from linear acceleration a and the output of accelerometer 310 using Eq. (3). Eq. (2) is only used if the condition provided with Eq. (2) is met. which is determined by logic 1402. Tilt data 920 and linear acceleration data 1404 is sent to the controller 1406. Input module 1408 provides desired linear acceleration $a_i$ as signal 1410 and desired tilt $α_i$ as signal 1412 to controller 1406. Controller 1406 receives the inputs of desired linear acceleration $a_i$ and desired tilt $α_i$ and generates at least one control signal 1416 to actuator 1418 based on a comparison of the input signals 1410 and 1412 and measurement data 1404 and 920. Actuator 1418 changes the motion state of motion-sensing device 300 through mechanical linkage 1420, generating new accelerometer outputs 910 and 970 and continuing the control loop.

The control system 1400 may be for various machines, vehicles, or the like, and the mechanical linkage 1420 may be indirect and include structural elements of such vehicles or machines. Input module 1408 may provide for manual inputs or may generate input signals 1410 and 1412 based on computerized calculations. In a particular embodiment, only one of tilt α and linear acceleration a may be used for controlling, while the other is used for informative display.

Figure 15:
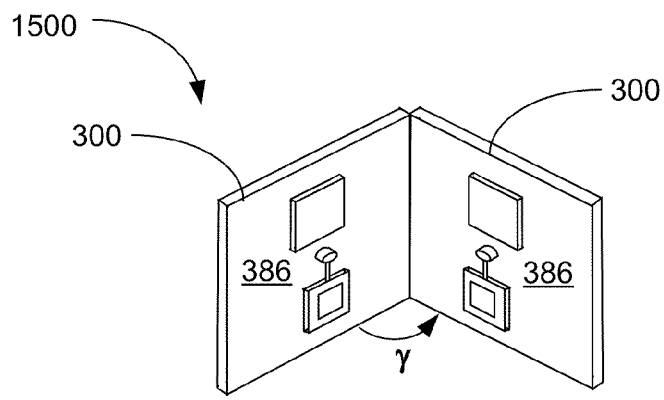
FIG. 15 is a partial front perspective view of an exemplary MEMS implementation of two exemplary motion-sensing devices configured to simultaneously measure linear acceleration and tilt in two planes, according to a preferred embodiment of the present invention.

FIG. 15 is a partial front perspective view of an exemplary MEMS implementation 1500 of two exemplary motion-sensing devices 300 configured to simultaneously measure linear acceleration a and tilt α in two planes, according to a preferred embodiment of the present invention. Angle γ is the angle between the geometric planes defined by the vertical surfaces 386 of the substrates 385, which is preferably 90°, but which may vary in particular alternate embodiments.

Although applicant has described applicant's preferred embodiments of this invention, it will be understood that the broadest scope of this invention includes such modifications as diverse materials and diverse accelerometers and tilt sensors. Such scope is limited only by the below claims as read in connection with the above specification. Further, many other advantages of applicant's invention will be apparent to those skilled in the art, once enlightened by the above descriptions and the below claims.

I claim:

1. A motion-sensing device for sensing tilt and acceleration when one of tilt, horizontal acceleration, and tilt and horizontal acceleration acting concurrently, influence said device, the device comprising:
   a. a substrate having a vertical surface;
   b. a first accelerometer fixed to said vertical surface of said substrate;
   c. a pendulum flexibly coupled to said vertical surface of said substrate; and
   d. a second accelerometer fixed to said pendulum.

2. The motion-sensing device of claim 1, wherein at least one of said first and second accelerometers comprises at least one of:
   a. a tilt sensor;
   b. a spring-mass system; and
   c. an accelerometer.

3. The motion-sensing device of claim 1, wherein:
   a. said first accelerometer comprises an accelerometer operable to measure tilt and acceleration in a first vertical geometric plane parallel to said vertical surface;
   b. said pendulum is constrained to move in said first geometric plane; and
   c. said second accelerometer comprises an accelerometer operable to measure acceleration in said first geometric plane.

4. The motion-sensing device of claim 3, wherein said pendulum flexibly coupled to said substrate is coupled via a support rod extending orthogonally from said vertical surface of said substrate proximate said first accelerometer.

5. The motion-sensing device of claim 3, comprising a first motion-sensing device, said first motion-sensing device having a fixed spatial relationship to a second motion-sensing device of claim 3, wherein said second motion-sensing device measures tilt and acceleration in a second vertical geometrical plane.

6. The motion sensing device of claim 5, wherein said fixed spatial relationship is an orthogonal relationship.

7. The motion-sensing device of claim 3, further comprising a damping fluid at least partially immersing said pendulum, wherein the density, viscosity, and volume of said damping fluid is selected to substantially critically damp motion of said pendulum.

8. The motion-sensing device of claim 3, wherein said motion-sensing device comprises a microelectromechanical system (MEMS) on a single integrated circuit chip.

9. The motion-sensing device of claim 1, configured as a sensor in a control system, wherein said control system requires both:
   a. linear acceleration measurement; and
   b. tilt measurement.

10. The motion-sensing device of claim 9, further comprising logic in which linear acceleration is determined based on the output of said second accelerometer.

11. The motion-sensing device of claim 9, wherein said determination of linear acceleration is made according to one of:
   a. $a = g \tan[\arc\sin(a_{370}/g)]$, wherein:
      i. g is gravitational acceleration;
      ii. $a_{370}$ is the output of said second accelerometer expressed in the same units as g; and
      iii. a is linear acceleration; and
   b. $a \approx a_{370}$, wherein:
      i. $a_{370}$ is the output of said second accelerometer; and
      ii. a is linear acceleration.

12. The motion-sensing device of claim 9, wherein said logic is operable to determine tilt angle based on the outputs of said first and second accelerometers.

13. The motion-sensing device of claim 12, wherein said determination of tilt angle is made according to $α = \arc\sin(a/k) - \arc\sin(a_{310}/k)$, wherein:
   a. α is tilt angle;
   b. a is linear acceleration;
   c. $a_{310}$ is the output of said first accelerometer; and
   d. $k = \sqrt{a^2 + g^2}$, wherein g is gravitational acceleration.

14. A motion-sensing device for sensing tilt and acceleration when one of tilt, horizontal acceleration, and tilt and horizontal acceleration acting concurrently, influence said device, the device comprising:
   a. a substrate having a vertical surface;
   b. a first accelerometer fixed to said vertical surface of said substrate;
   c. a pendulum flexibly coupled to said vertical surface of said substrate:
      i. via a supporting rod extending orthogonally from said vertical surface; and
      ii. proximate to said first accelerometer;
   d. a second accelerometer fixed to said pendulum; and e. a damping fluid at least partially immersing said pendulum, wherein the density, viscosity, and volume of said damping fluid is selected to substantially critically damp motion of said pendulum.

15. The motion-sensing device of claim 14, wherein at least one of said first and second accelerometers comprises at least one of:
   a. a tilt sensor;
   b. a spring-mass system; and
   c. an accelerometer.

16. The motion-sensing device of claim 14, comprising a first motion-sensing device, said first motion-sensing device having a fixed orthogonal relationship to a second motion-sensing device of claim 3, wherein said second motion-sensing device measures tilt and acceleration in a second vertical geometrical plane.

17. The motion-sensing device of claim 14, configured as a sensor in a control system, wherein said control system requires both linear acceleration and tilt, the control system further comprising logic operable to determine both linear acceleration and tilt from said first and second accelerometers.

18. The motion-sensing device of claim 17, wherein:
   a. said determination of linear acceleration is made according to one of:
      i. a=g tan [arc sin ($a_{370}$/g)], wherein:
         1. g is gravitational acceleration;
         2. $a_{370}$ is the output of said second accelerometer expressed in the same units as g; and
         3. a is linear acceleration; and
      ii. a≅$a_{370}$, wherein:
         1. $a_{370}$ is the output of said second accelerometer; and
      iii. a is linear acceleration; and
   b. said determination of tilt angle is made according to α=arc sin (a/k)–arc sin ($a_{310}$/k), wherein:
      i. α is tilt angle;
      ii. a is linear acceleration;
      iii. $a_{310}$ is the output of said first accelerometer; and
      iv. k=$\sqrt{a^2+g^2}$, wherein g is gravitational acceleration.

19. A motion-sensing device for sensing tilt and acceleration when one of tilt, horizontal acceleration, and tilt and horizontal acceleration acting concurrently, influence said device, the device comprising:
   a. a substrate having a vertical surface;
   b. a first accelerometer fixed to said vertical surface of said substrate, said first accelerometer operable to measure tilt and acceleration in a first vertical geometric plane parallel to said vertical surface;
   c. a pendulum flexibly coupled to said vertical surface of said substrate:
      i. via a supporting rod extending orthogonally from said vertical surface; and
      ii. proximate to said first accelerometer, wherein said pendulum is constrained to move in said first geometric plane;
   d. a second accelerometer fixed to said pendulum, said second accelerometer operable to measure acceleration in said first geometric plane, wherein at least one of said first and second accelerometers comprises at least one of:
      i. a tilt sensor;
      ii. a spring-mass system; and
      iii. an accelerometer; and
   e. a damping fluid at least partially immersing said pendulum, wherein the density, viscosity, and volume of said damping fluid is selected to substantially critically damp motion of said pendulum; and
   f. a logic operable to determine linear acceleration and tilt from said first and second accelerometer outputs, wherein
      i. said determination of linear acceleration is made according to one of:
         1. a=g tan [arc sin ($a_{370}$/g)], wherein:
            a. g is gravitational acceleration;
            b. $a_{370}$ is the output of said second accelerometer expressed in the same units as g; and
            c. a is linear acceleration; and
         2. a≅$a_{370}$, wherein:
            a. $a_{370}$ is the output of said second accelerometer; and
            b. a is linear acceleration; and
      ii. said determination of tilt angle is made according to α=arc sin (a/k) –arc sin ($a_{310}$/k), wherein:
         1. α is tilt angle;
         2. a is linear acceleration;
         3. $a_{310}$ is the output of said first accelerometer; and
         4. k=$\sqrt{a^2+g^2}$, wherein g is gravitational acceleration.

20. The motion-sensing device of claim 19, comprising a first motion-sensing device, said first motion-sensing device having a fixed orthogonal relationship to a second motion-sensing device of claim 19, wherein said second motion-sensing device measures tilt and acceleration in a second vertical geometrical plane.

* * * * *